US012654202B2

(12) United States Patent
Takahashi et al.

(10) Patent No.: US 12,654,202 B2
(45) Date of Patent: Jun. 16, 2026

(54) VIBRATION TRANSMITTING DEVICE, AND WARNING NOTIFICATION DEVICE, AUDIO DEVICE, AND MASSAGE DEVICE PROVIDED WITH SAME

(71) Applicants: Yuki Takahashi, Tokyo (JP); Tomoya Ishitani, Tokyo (JP); Shinji Hirabayashi, Tokyo (JP)

(72) Inventors: Yuki Takahashi, Tokyo (JP); Tomoya Ishitani, Tokyo (JP); Shinji Hirabayashi, Tokyo (JP)

(73) Assignee: MINEBEA MITSUMI Inc., Nagano (JP)

( * ) Notice: Subject to any disclaimer, the term of this patent is extended or adjusted under 35 U.S.C. 154(b) by 129 days.

(21) Appl. No.: 18/574,095

(22) PCT Filed: Jun. 29, 2022

(86) PCT No.: PCT/JP2022/026045
§ 371 (c)(1),
(2) Date: Dec. 26, 2023

(87) PCT Pub. No.: WO2023/277087
PCT Pub. Date: Jan. 5, 2023

(65) Prior Publication Data
US 2024/0307916 A1 Sep. 19, 2024

(30) Foreign Application Priority Data

Jun. 30, 2021 (JP) ................................. 2021-109231

(51) Int. Cl.
*H02K 1/34* (2006.01)
*B06B 1/04* (2006.01)
(Continued)

(52) U.S. Cl.
CPC ............... *B06B 1/045* (2013.01); *H02K 1/34* (2013.01); *H02K 33/02* (2013.01); *H02K 33/16* (2013.01)

(58) Field of Classification Search
CPC .......... H02K 1/34; H02K 33/16; H02K 33/18; H02K 33/02; B06B 1/045
See application file for complete search history.

(56) References Cited

U.S. PATENT DOCUMENTS

2010/0313689 A1 12/2010 Quenerch'Du
2017/0297463 A1 10/2017 Yoshikawa
(Continued)

FOREIGN PATENT DOCUMENTS

CN 101920781 A 12/2010
CN 111130295 A 5/2020
(Continued)

OTHER PUBLICATIONS

Kawada (JP-2005270591-A) English Translation (Year: 2005).*
(Continued)

*Primary Examiner* — Tulsidas C Patel
*Assistant Examiner* — Robert E Mates
(74) *Attorney, Agent, or Firm* — Shih IP Law Group, PLLC.

(57) ABSTRACT

This vibration transmitting device comprises: a vibrating actuator which causes a movable body, which is supported in such a way as to be capable of vibrating elastically with respect to a fixed body, to vibrate by driving the movable body in one direction of the vibration direction of said movable body; and an accommodating unit for internally accommodating the vibrating actuator. The accommodating unit has an opening portion exposing at least a portion of the movable body such that the movable body comes into contact with an object to which vibrations are to be imparted, and the vibration transmitting device is provided with a projecting portion which projects from the movable body to the exterior of the accommodating unit through the opening portion.

13 Claims, 17 Drawing Sheets

(51) Int. Cl.
  *H02K 33/02*     (2006.01)
  *H02K 33/16*     (2006.01)

(56)               References Cited

U.S. PATENT DOCUMENTS

2019/0247262 A1 * 8/2019 Wheat ................ A61H 23/0263
2020/0136488 A1   4/2020 Takahashi
2021/0149491 A1   5/2021 Takahashi

FOREIGN PATENT DOCUMENTS

| | | | |
|---|---|---|---|
| CN | 112817438 | A | 5/2021 |
| JP | 2005270591 | A * | 10/2005 |
| JP | 2010-240553 | A | 10/2010 |
| JP | 6578290 | B2 | 9/2019 |
| JP | 2020089238 | A * | 6/2020 ............. G06F 3/016 |

OTHER PUBLICATIONS

International Search Report from International Application No. PCT/JP2022/026045 mailed Sep. 13, 2022.
Chinese First Office Action for Application No. 202280046154.7, dated Jan. 24, 2026.

* cited by examiner

100

100

100

VIBRATION TRANSMITTING DEVICE, AND WARNING NOTIFICATION DEVICE, AUDIO DEVICE, AND MASSAGE DEVICE PROVIDED WITH SAME

TECHNICAL FIELD

The present invention relates to a vibration transmitting device that transmits vibration to the user, and a warning notification device, an audio device and a massage device including the vibration transmitting device.

BACKGROUND ART

A device that transmits vibration to the user seated in a seat with a vibration transmitting device provided in the seat is known (see PTL 1). For example, in PTL 1, a vibration transmitting device is provided in an in-vehicle seat, and when transmitting information such as warning to the driver seated in the seat, vibration is transmitted with the vibration transmitting device. The vibration transmitting device of PTL 1 uses a motor with an eccentric weight attached to the rotation shaft (hereinafter referred to as vibration motor) to generate the vibration.

CITATION LIST

Patent Literature

PTL 1
Japanese Patent Publication No. 6578290

SUMMARY OF INVENTION

Technical Problem

The vibration motor rotates the eccentric weight to vibrate the vibration motor body, and basically it is difficult to obtain vibration strong enough to stimulate the user's sense of touch, muscles, etc., unless the eccentric weight and/or the rotation speed is increased. It is also difficult to directly transmit the vibration generated by the vibration motor body because the vibration motor is often housed inside a case to prevent entry of substances (e.g., dust) that interfere with the rotation of the eccentric weights. As such, the stimulation of the vibration generated by the vibration motor for the user is weak, and in some cases, the user may not notice the vibration. In addition, a vibration motor requires a sufficient number of revolutions to obtain the maximum amount of vibration, and it takes time to reach that speed, resulting in poor responsiveness and making it difficult to transmit the vibration immediately to the user. As such, a vibration transmitting device using a vibration motor is difficult to obtain strong vibration and has poor responsiveness, and therefore a vibration transmitting device capable of immediately applying strong vibration is desired.

An object of the present invention is to provide a vibration transmitting device capable of immediately applying strong vibration, and a device including the vibration transmitting device.

Solution to Problem

A vibration transmitting device according to the present invention includes: a vibration actuator configured to vibrate a movable body by driving the movable body in one direction of a vibration direction of the movable body, the movable body being supported such that the movable body is allowed to elastically vibrate with respect to a fixing body; and a housing part configured to house inside the vibration actuator. The housing part includes an opening configured to expose at least a part of the movable body such that the movable body makes contact with an object to which vibration is to be applied.

A warning notification device according to the present invention includes the above-described vibration transmitting device, and the warning notification device notices a warning to a subject person by providing vibration to the subject person by the vibration transmitting device.

An audio device according to the present invention includes the above-described vibration transmitting device, and the audio device provides vibration based on a sound source to a subject person by the vibration transmitting device.

A massage device according to the present invention includes the above-described vibration transmitting device, and the massage device performs a massage for a subject person by providing vibration to the subject person by the vibration transmitting device.

Advantageous Effects of Invention

According to the present invention, strong vibration can be applied immediately.

3

Figure 11:
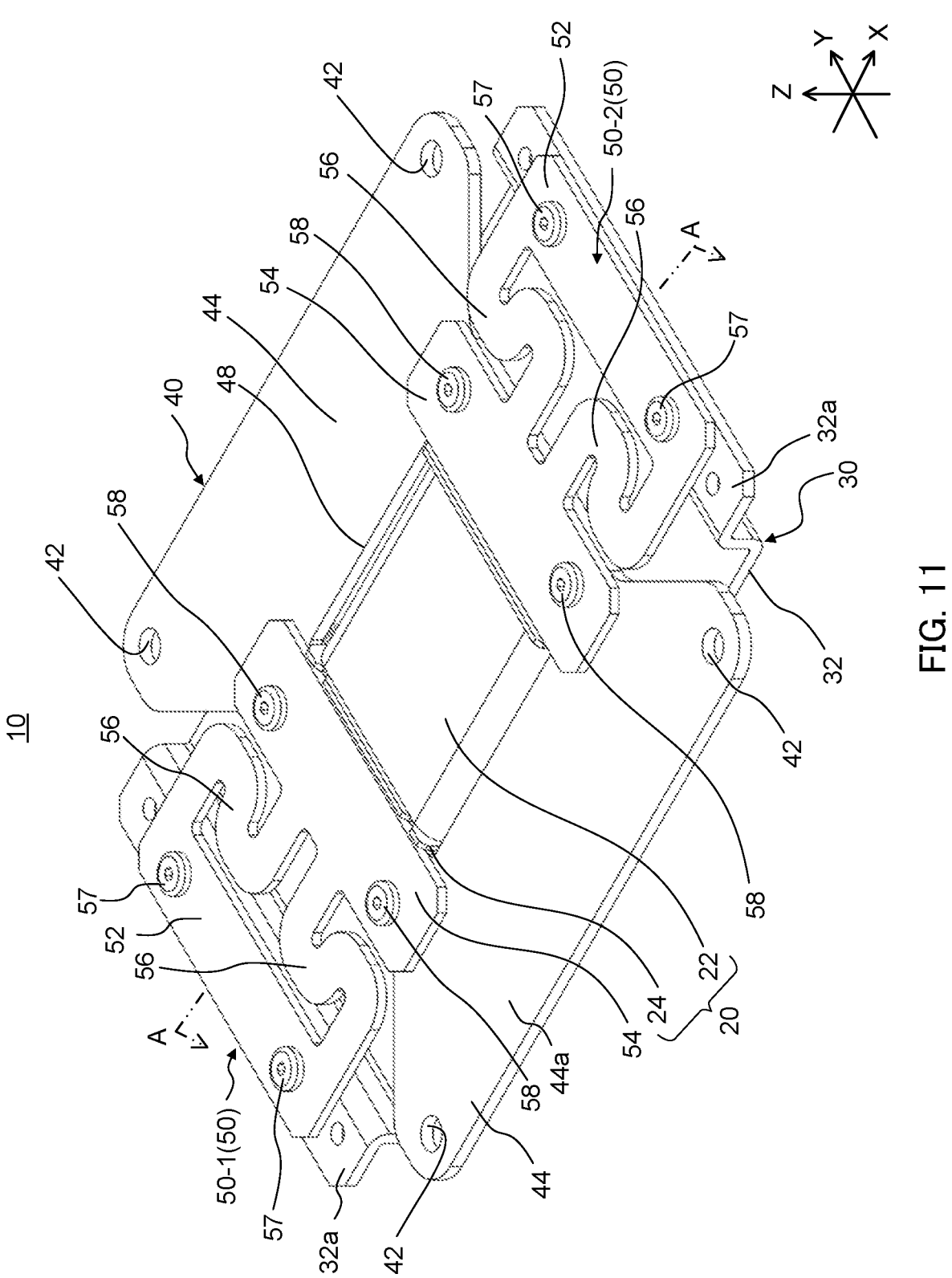
FIG. 11 is a perspective view of an electromagnetic actuator provided in the vibration transmitting device illustrated in FIG. 1 as viewed from an obliquely upper side.
Figure 15:
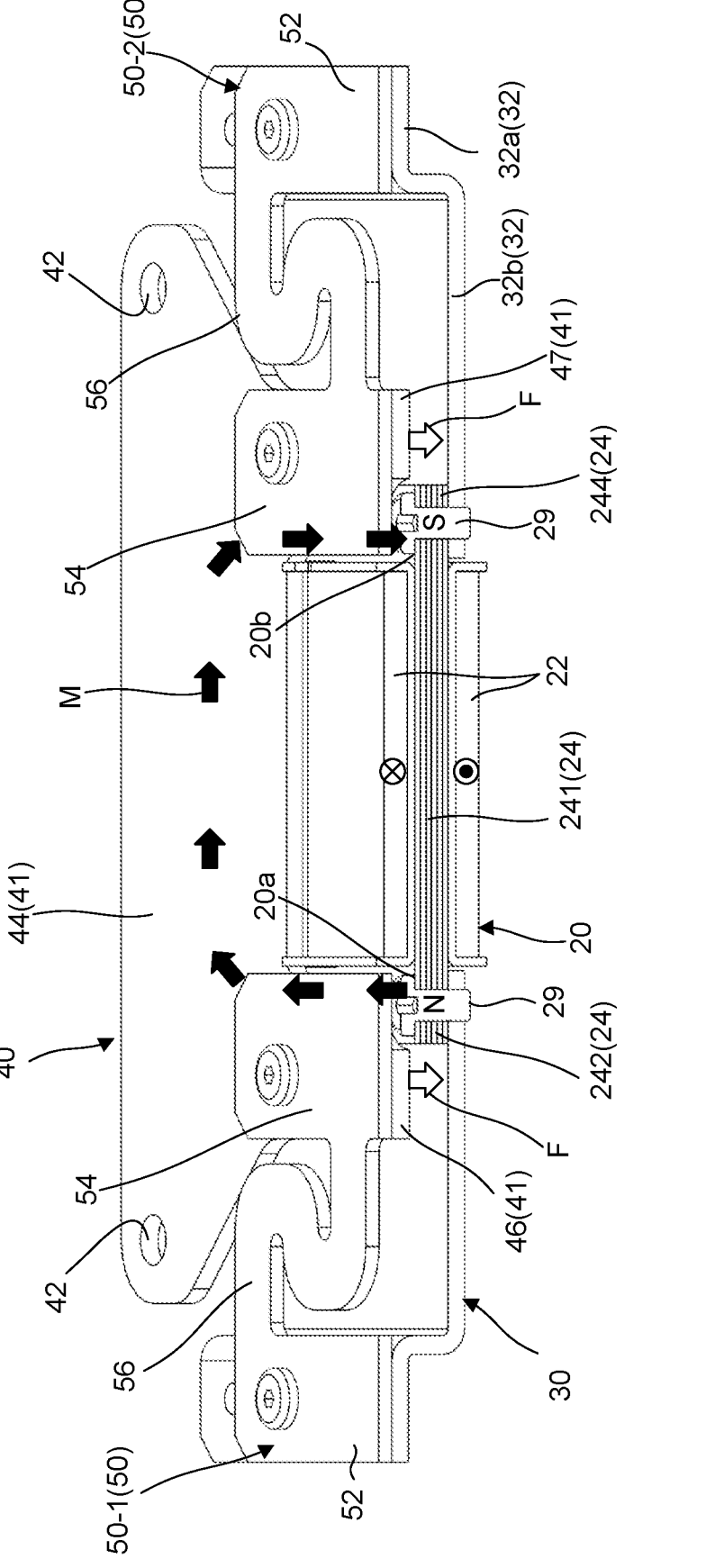
Figures 16A, 16B:
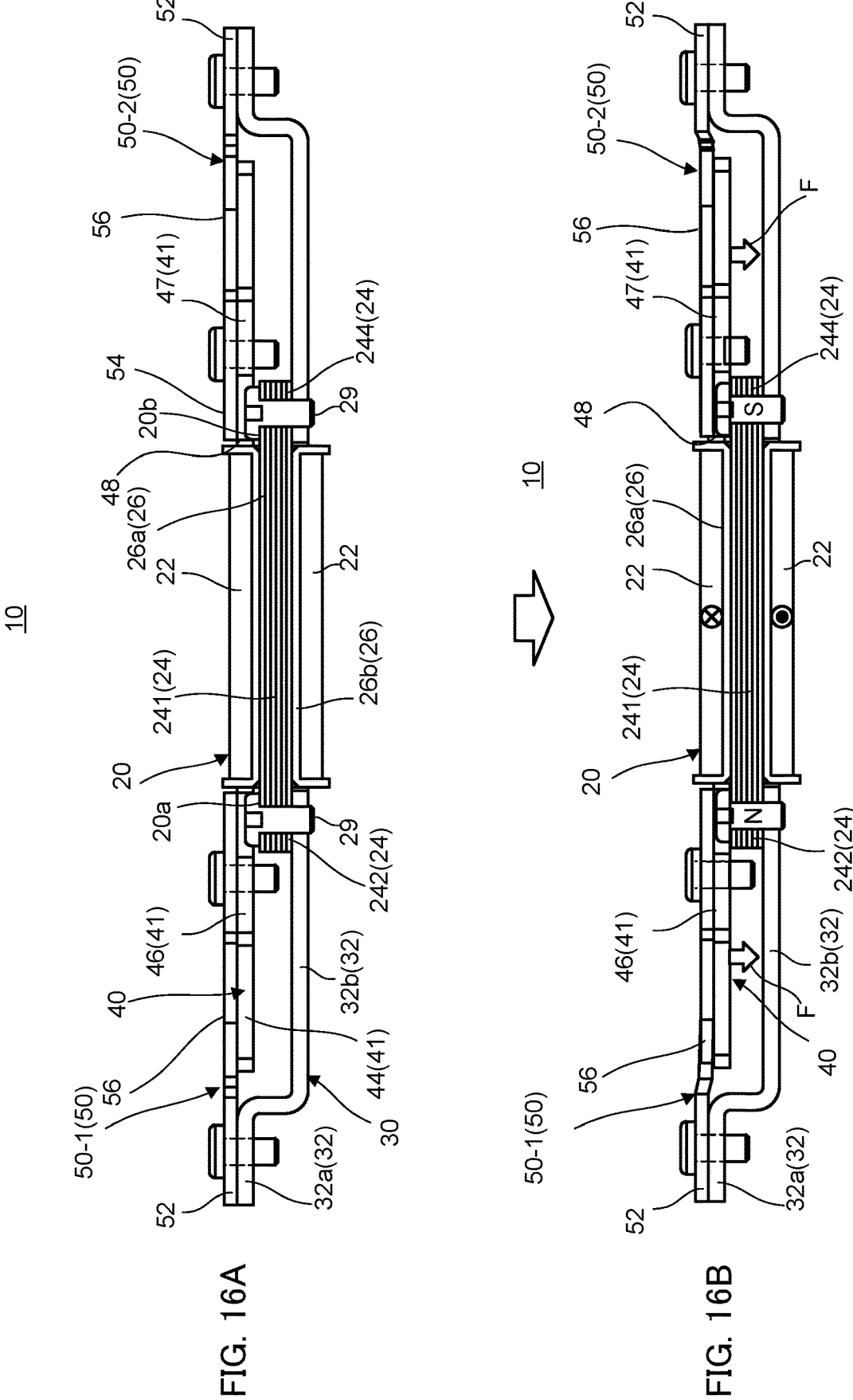
Figure 17:
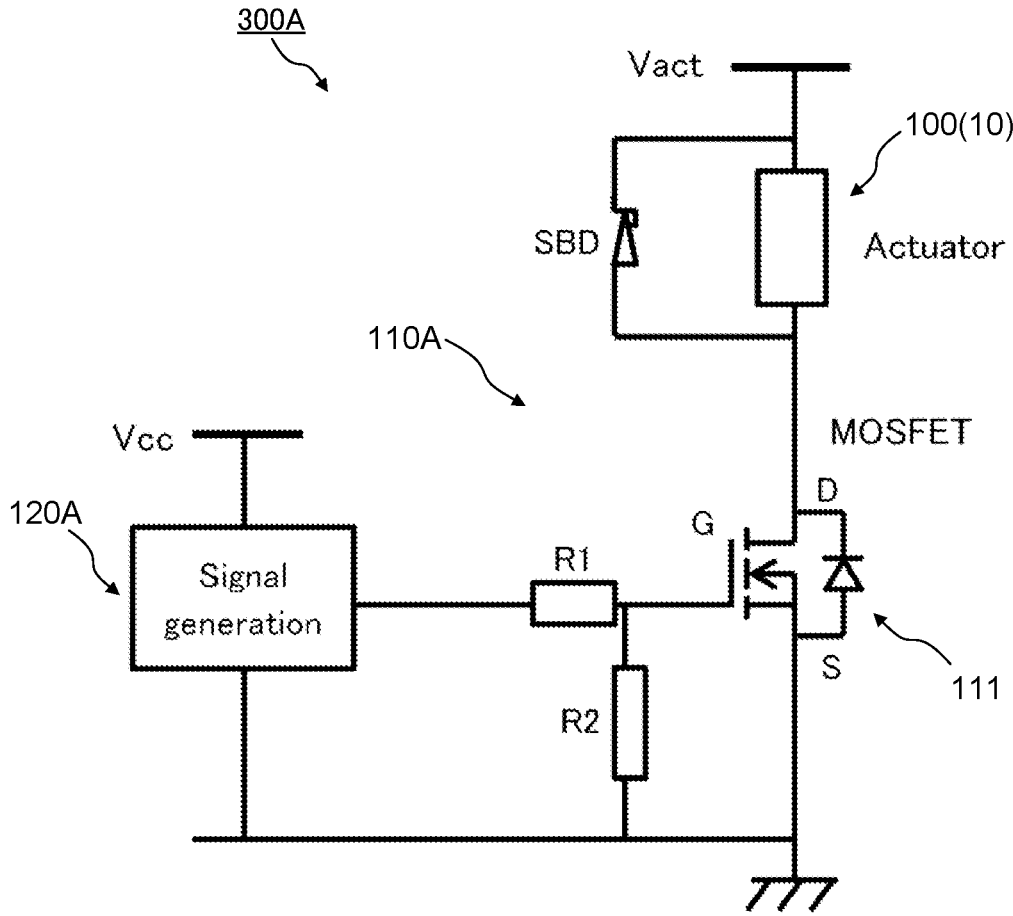
Figure 18:
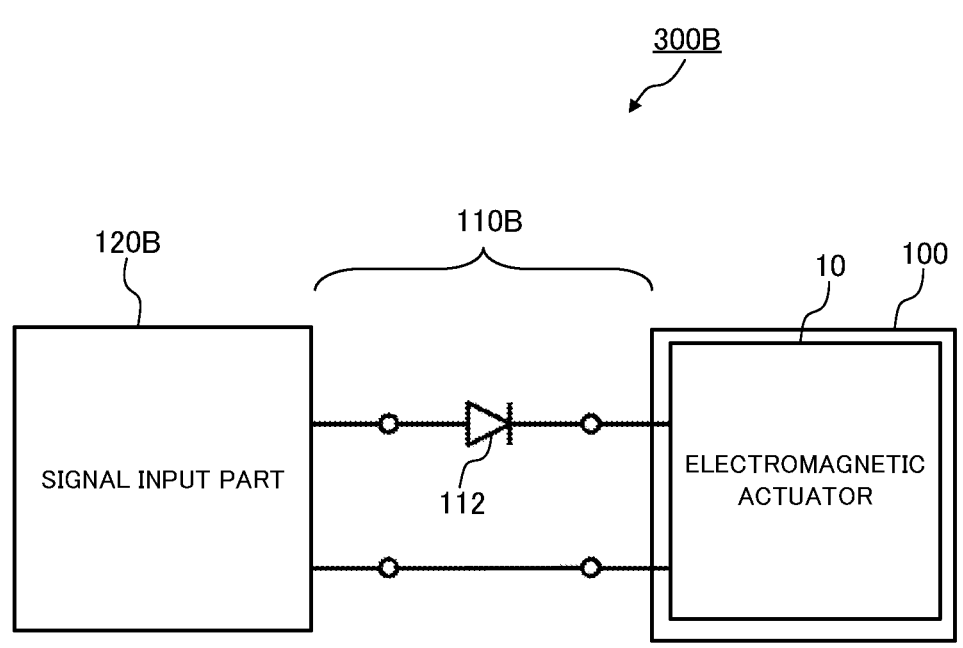
Figure 19:
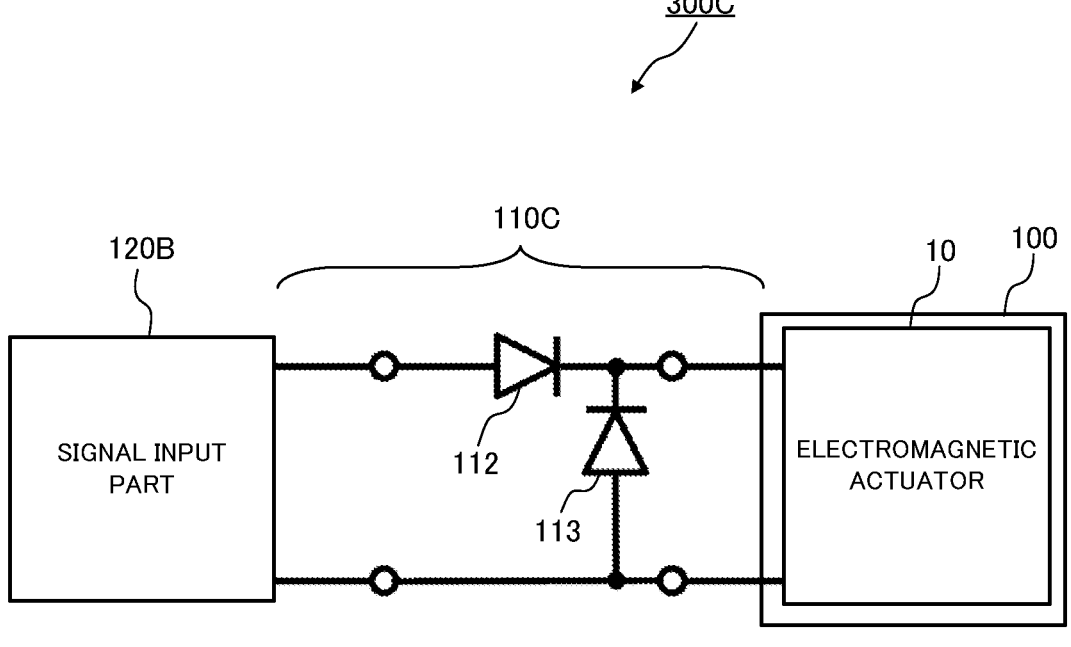
Figure 20:
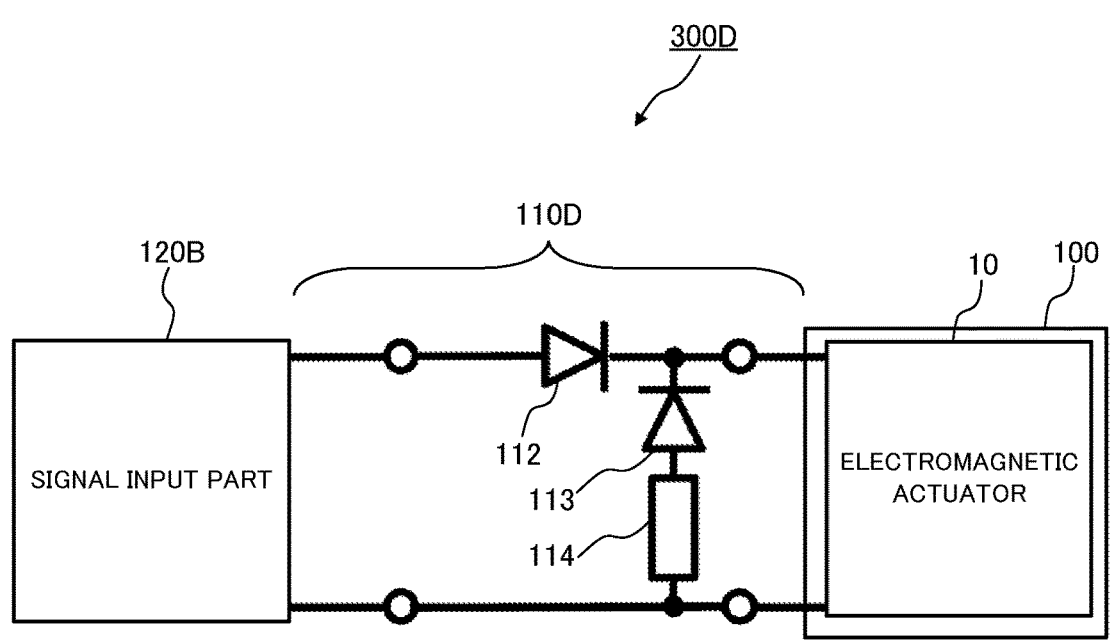
Figure 21:
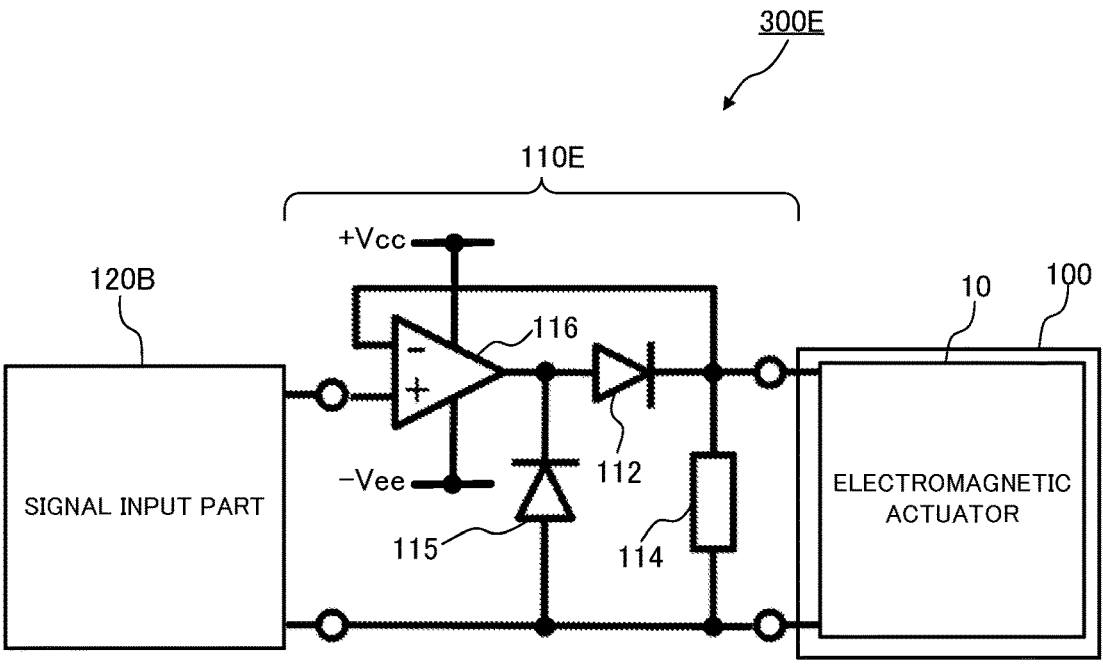
Figure 22:
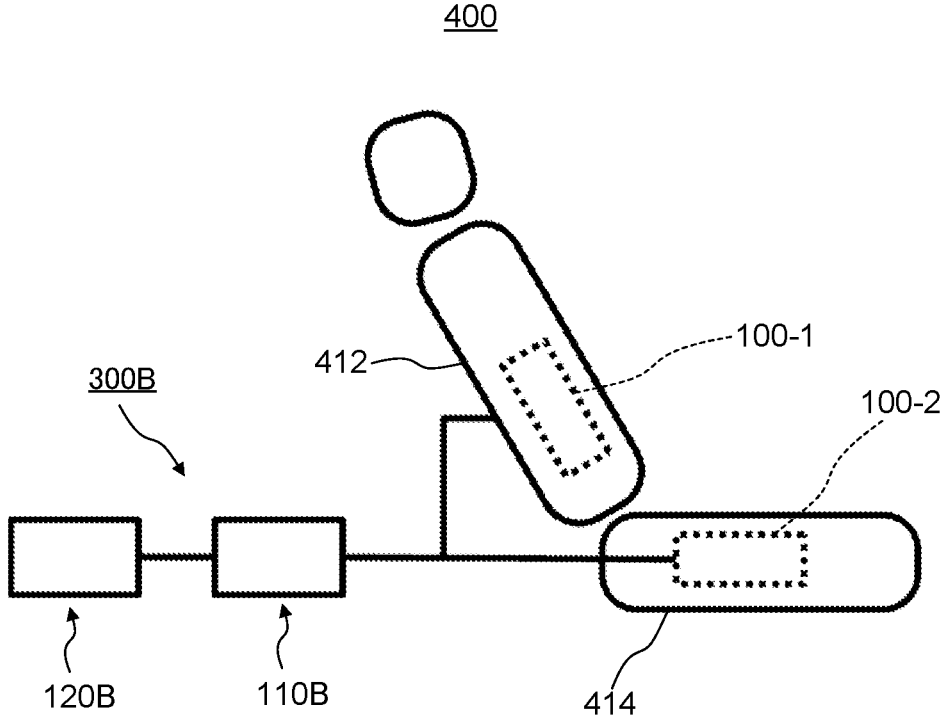

FIG. 15 is a diagram illustrating a configuration of a magnetic circuit of the electromagnetic actuator illustrated in FIG. 11;

FIGS. 16A and 16B are diagrams for describing an operation of the electromagnetic actuator illustrated in FIG. 11;

FIG. 17 is a diagram illustrating an example (example configuration 1) of a vibration transmitting unit;

FIG. 18 is a diagram illustrating another example (example configuration 2) of the vibration transmitting unit;

FIG. 19 is a diagram illustrating another example (example configuration 3) of the vibration transmitting unit;

FIG. 20 is a diagram illustrating another example (example configuration 4) of the vibration transmitting unit;

FIG. 21 is a diagram illustrating another example (example configuration 5) of the vibration transmitting unit; and FIG. 22 is a diagram illustrating a mounting example of the vibration transmitting unit.

DESCRIPTION OF EMBODIMENTS

An embodiment of the present invention is elaborated below with reference to the accompanying drawings.

The present embodiment is described by using an orthogonal coordinate system (X, Y, Z). The drawings described later are also described with the common orthogonal coordinate system (X, Y, Z). In the following, the width, depth and height of vibration transmitting device 100 are the lengths in the X direction, Y direction and Z direction, respectively, and the width, depth, height of electromagnetic actuator 10 are the lengths in the X direction, Y direction, and Z direction, respectively. In addition, the plus side in the Z direction is the direction in which the vibration is applied to the user (the portion to which vibration is to be applied) and referred to as "upper side", and the minus side in the Z direction is the direction away from the user and referred to as "lower side".

Vibration Transmitting Device 100

Vibration transmitting device 100 according to the present embodiment is described below with reference to FIGS. 1 to 7.

Figure 1:
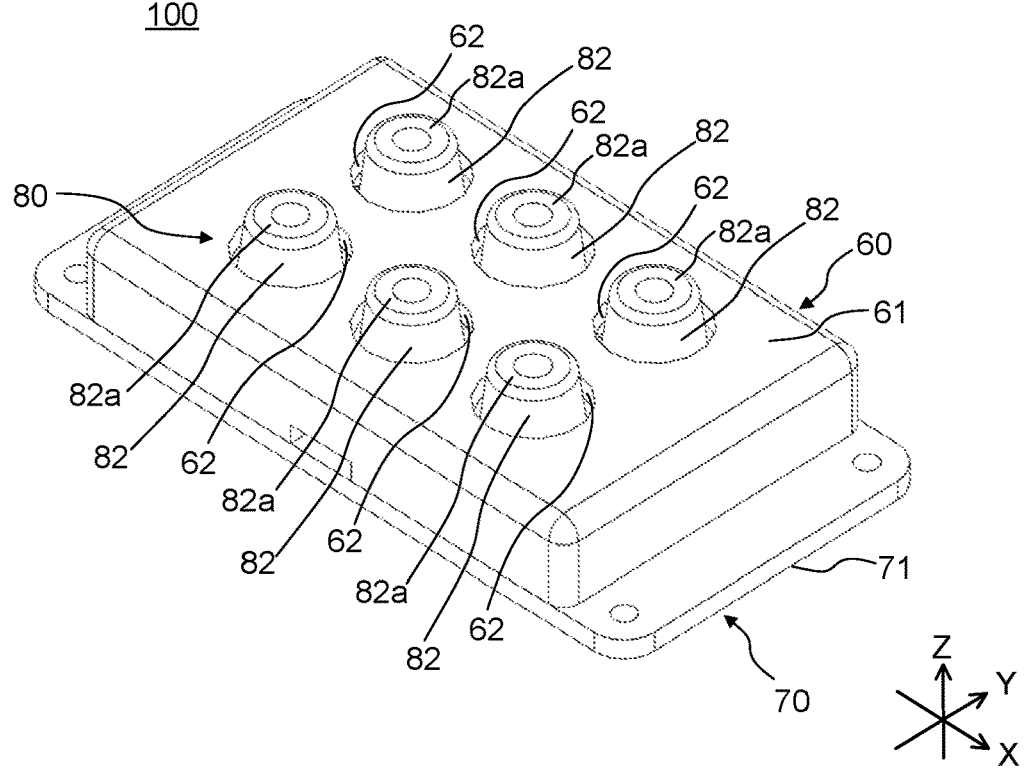
FIG. 1 is a perspective view of a vibration transmitting device according to an embodiment of the present invention, as viewed from an obliquely upper side.
Figure 2:
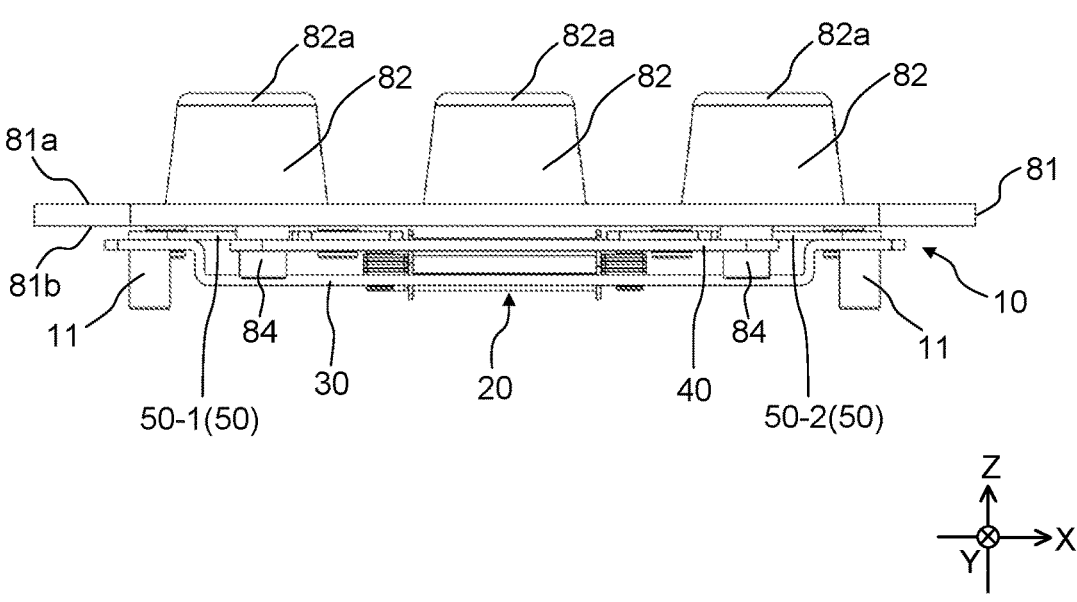
FIG. 2 is a side view illustrating a state where a housing lid part and a housing base part are detached from the vibration transmitting device illustrated in FIG. 1.
Figure 3:
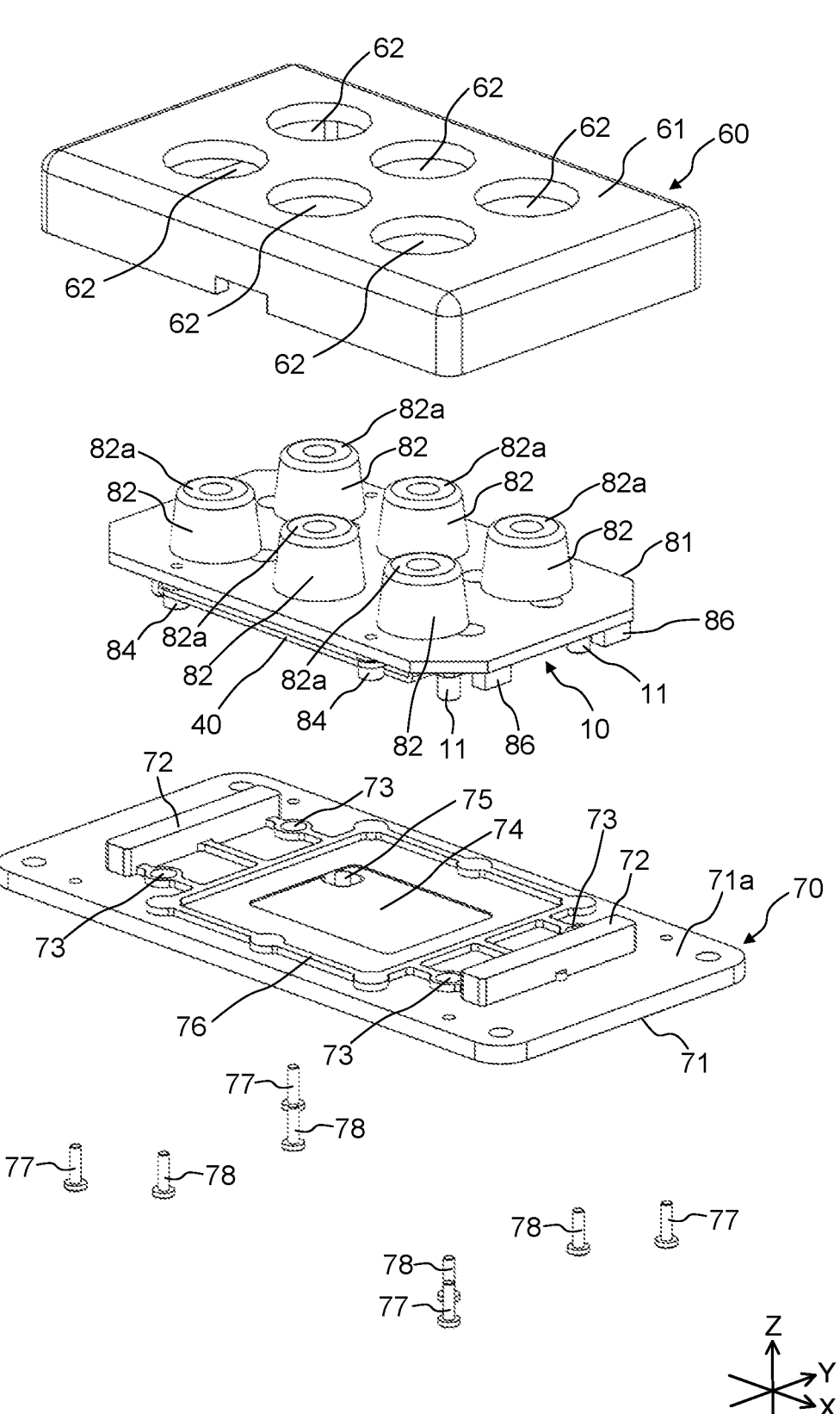
FIG. 3 is an exploded perspective view of a main configuration of the vibration transmitting device illustrated in FIG. 1, as viewed from an obliquely upper side.
Figure 4:
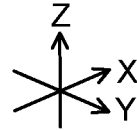
FIG. 4 is an exploded perspective view of a main configuration of the vibration transmitting device illustrated in FIG. 1, as viewed from an obliquely lower side.
Figure 5:
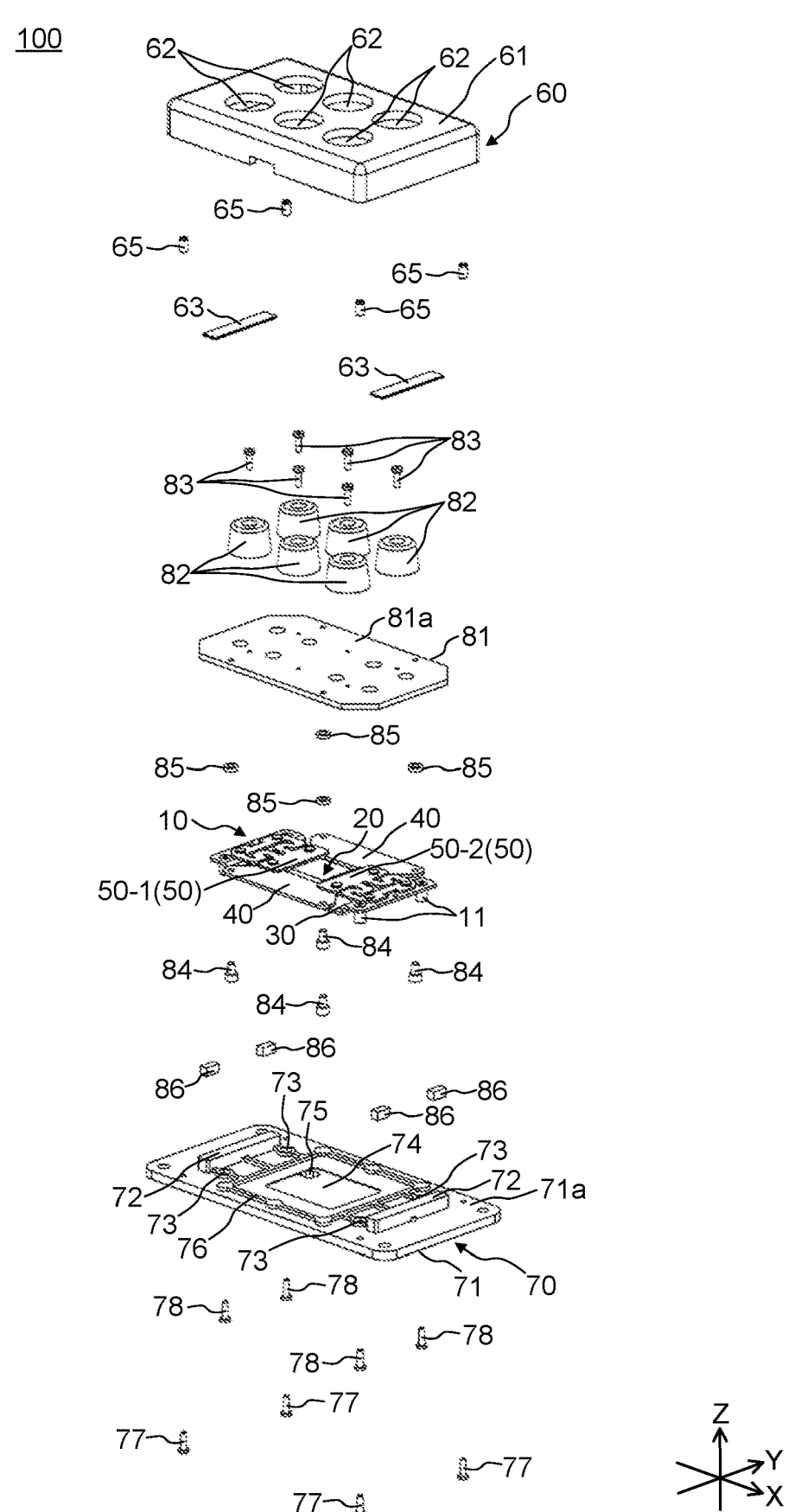
FIG. 5 is another exploded perspective view of a part of the vibration transmitting device illustrated in FIG. 3, as viewed from an obliquely upper side.
Figure 6:
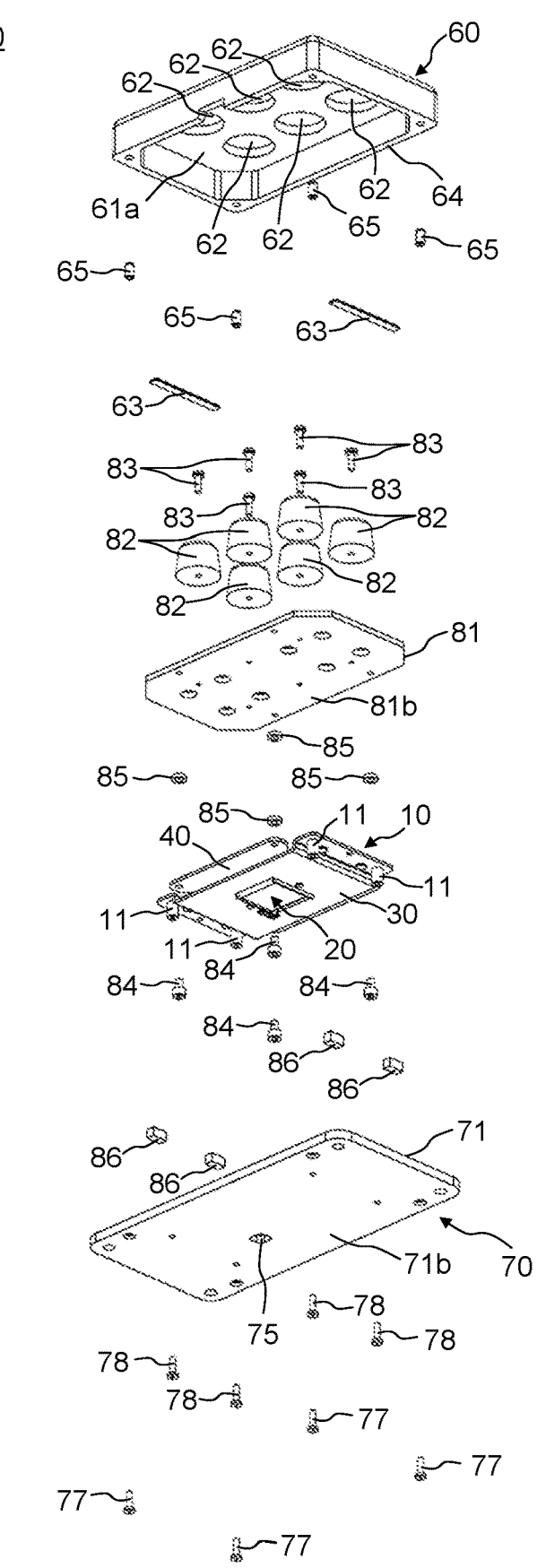
FIG. 6 is another exploded perspective view of a part of the vibration transmitting device illustrated in FIG. 4, as viewed from an obliquely lower side.
Figure 6:
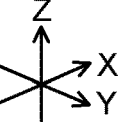
Figure 7:
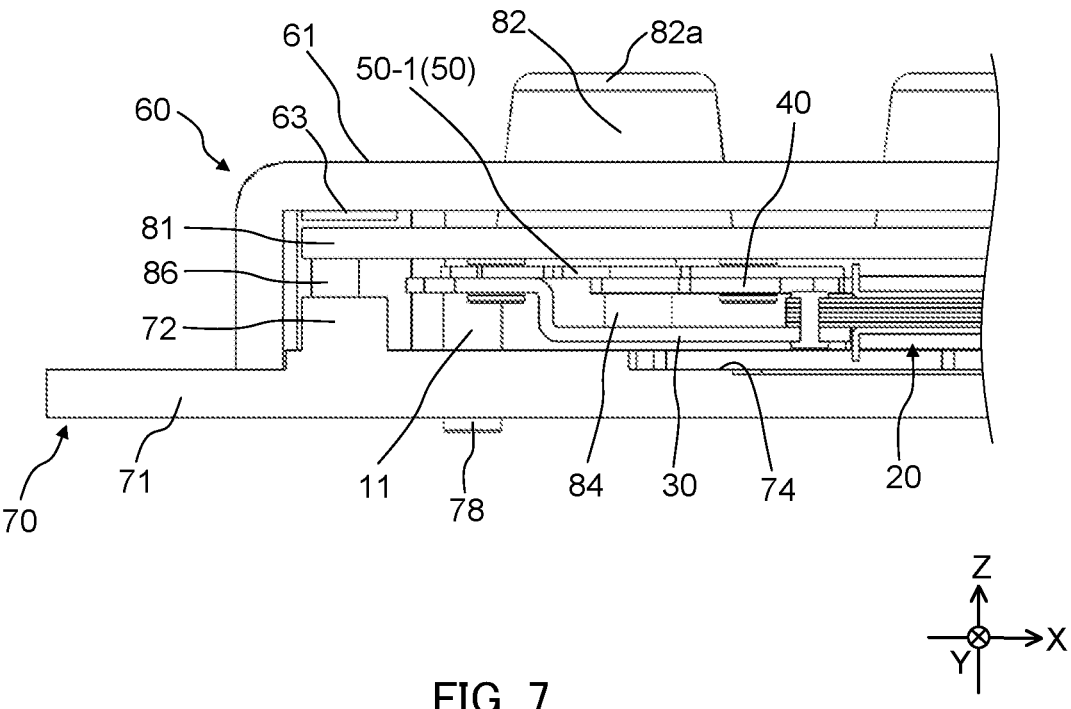
FIG. 7 is a diagram for describing a part of the inside of the vibration transmitting device illustrated in FIG. 1.

FIG. 1 is a perspective view illustrating vibration transmitting device 100. FIG. 2 is a side view illustrating a state where a housing lid part and a housing base part are detached from vibration transmitting device 100. FIG. 3 is an exploded perspective view of a main configuration of vibration transmitting device 100, as viewed from an obliquely upper side. FIG. 4 is an exploded perspective view of a main configuration of vibration transmitting device 100, as viewed from an obliquely lower side. FIG. 5 is another exploded perspective view of a part of vibration transmitting device 100 illustrated in FIG. 3, as viewed from an obliquely upper side. FIG. 6 is another exploded perspective view of a part of vibration transmitting device 100 illustrated in FIG. 4, as viewed from an obliquely lower side. FIG. 7 is a diagram for describing a part of the inside of vibration transmitting device 100.

Vibration transmitting device 100 illustrated in FIGS. 1 to 7 is a device that includes electromagnetic actuator 10 as an example of the vibration actuator, and applies and transmits, to a subject (for example, a subject person), the vibration generated in electromagnetic actuator 10 in accordance with the input driving signal. Note that the driving signal is described later with reference to FIGS. 17 to 21.

Vibration transmitting device 100 is provided in seat 400 illustrated in FIG. 22 described later to apply vibration to the user (subject person) seated in seat 400, for example. Seat 400 provided with vibration transmitting device 100 functions as a warning notification device that notices a warning to the user, a massage device that massages the user by applying vibration to the user, and an audio device that applies vibration based on the sound source to the user.

As illustrated in FIGS. 1 to 4, vibration transmitting device 100 includes electromagnetic actuator 10, housing lid part 60, housing base part 70, and transmitting part 80.

Housing lid part 60 and housing base part 70 are housing parts that house electromagnetic actuator 10 inside. As described below, electromagnetic actuator 10 is fixed to housing base part 70, and housing lid part 60 is fixed to housing base part 70 so as to cover electromagnetic actuator 10. In addition, as described below, transmitting part 80 is configured to be attached to movable body 40 of electromagnetic actuator 10 such that at least a part of protruding part 82 described later protrudes to the outside of housing lid part 60 through opening 62 of housing lid part 60.

Housing Lid Part 60

Housing lid part 60 is a lidded cylindrical member that houses electromagnetic actuator 10 in a covering manner between housing lid part 60 and housing base part 70, and is formed in a rectangular shape in plan view as viewed from the Z direction, for example. Housing lid part 60 includes opposing surface 61 facing the user on the plus side in the Z direction. Opening 62 extending through opposing surface 61 is formed in opposing surface 61 in accordance with the number of protruding parts 82 of transmitting part 80. Here, a total of six openings 62 in 2×3 rows are formed, for example.

In addition, as illustrated in FIG. 4, impact absorbing part 63 (the limiting part in the present invention) facing movable panel 81 of transmitting part 80 described later is provided at inner surface 61a, which is a surface of opposing surface 61 on the inside (electromagnetic actuator 10 side). Impact absorbing part 63 is composed of a damper formed of an elastomer, for example. When movable panel 81 makes contact with impact absorbing part 63, the movement (protrusion) of movable panel 81 to the plus side in the Z direction during the vibration is suppressed, and the impact from movable panel 81 is absorbed.

In addition, as illustrated in FIG. 4, insert nut 65 is provided at bottom part 64 that makes contact with housing base part 70 in housing lid part 60. Here, for example, insert nut 65 is disposed at each of four corner parts 64a of bottom part 64. Housing lid part 60 is fixed to housing base part 70 by threadedly engaging screw 77 described later with insert nut 65.

Housing Base Part 70

Housing base part 70 includes a flat-shaped fixing plate 71 on which electromagnetic actuator 10 and housing lid part 60 are fixed. At inner surface 71a as the surface of fixing plate 71 on the inner side (electromagnetic actuator 10 side), projecting part 72 facing impact absorbing part 86 described later is provided to protrude to the plus side in the Z direction. Here, for example, projecting parts 72 are disposed in cuboid shapes extending along the X direction at two locations on inner surface 71a such that two projecting parts 72 correspond to four impact absorbing parts 86 disposed at four corner portions of movable panel 81.

In addition, insertion part 73 for insertion of support column 11 described later is provided at inner surface 71a of fixing plate 71. Here, for example, insertion part 73 is formed in a cylindrical shape and disposed at four locations in inner surface 71a in a manner corresponding to columnar support columns 11 disposed at four corner portions of fixing body 30 described later.

In addition, recess 74 as a space for housing core assembly 20 described later is provided in a recessed manner in inner surface 71a of fixing plate 71. Here, for example, recess 74 is formed in a rectangular shape and disposed at one location at a center portion of inner surface 71a in a manner corresponding to rectangular core assembly 20 disposed at a center portion of fixing body 30. With such a recess 74, the height and thickness can be reduced by reducing the length (thickness) of vibration transmitting device 100 in the Z direction.

In addition, through hole 75 for passing the wiring connected to electromagnetic actuator 10 is provided inside recess 74. In addition, rib 76 surrounding recess 74 is provided around recess 74. Rib 76 provided around recess 74 recessed from inner surface 71a of fixing plate 71 improves the strength of fixing plate 71.

In addition, although the illustration of the reference numeral is omitted, insertion holes for insertion of screw 77 and screw 78 as securing members are formed in fixing plate 71. Screw 77 is inserted to the insertion hole of fixing plate 71 and threadedly engaged with insert nut 65 to fix housing lid part 60 to housing base part 70. In addition, screw 78 is inserted to the insertion hole of fixing plate 71 and threadedly engaged with support column 11 to fix fixing body 30 of electromagnetic actuator 10 to housing base part 70.

Transmitting Part 80

Transmitting part 80 is a part that transmits to the outside the vibration of electromagnetic actuator 10 housed inside the housing part (housing lid part 60 and housing base part 70).

Transmitting part 80 includes flat movable panel 81 to which protruding part 82 is fixed. Desirably, movable panel 81 has a flat shape in view of the height reduction and thickness reduction of vibration transmitting device 100, but the shape, material, configuration and the like are not limited as long as it allows for fixing of protruding part 82 and attaching to movable body 40 described later.

Protruding part 82 is attached to top surface 81a as a surface of movable panel 81 on the plus side in the Z direction by means of screw 83 as a securing member. Here, for example, protruding part 82 is attached to top surface 81a such that at least a part of protruding part 82 protrudes to the outside of housing lid part 60 through opening 62 of housing lid part 60. In addition, in this case, a total of six protruding parts 82 in 2×3 rows are attached to top surface 81a, for example.

Protruding part 82 is disposed to make direct or indirect contact with the user through another member (a material such as a cushion and cloth for transmitting the vibration) when vibration transmitting device 100 is installed. In addition, desirably, protruding part 82 makes point contact or substantial point contact with the user without making the applied force excessive such that the vibration can be strongly transmitted to the touching user (with the applied force concentrated). In view of this, protruding part 82 is configured to be tapered toward the tip end (the plus side in the Z direction). With protruding part 82 disposed and configured in this manner, the vibration can be reliably transmitted to the user such that protruding part 82 reliably makes contact with the stimulation target portion of the user even when the posture, orientation and the like of the user seated in seat 400 described later change, for example.

The material of tip end portion 82a of protruding part 82 on the user side (the plus side in the Z direction) may be the same as that of protruding part 82, or may be changed in accordance with the intended use. For example, the material of tip end portion 82a may be changed depending on the application such as the above-described warning notification device, massage device, or audio device to transmit vibration of an appropriate strength to the user.

For example, the vibration with high intensity is preferable for the warning notification device for the purpose of the warning, whereas the vibration with appropriate intensity, neither too high nor low, is preferable for the massage device and the audio device. The material of protruding part 82 and tip end portion 82a may be metal or the like, while lightweight materials with selectable hardness such as plastic and rubber may also be used.

In this manner, the shape, material, configuration and the like of protruding part 82 are changed as necessary in accordance with the intensity of the vibration to be transmitted to the user.

Bottom surface 81b as the surface of movable panel 81 on the minus side in the Z direction is attached to movable body 40 of electromagnetic actuator 10 by means of screw 84 as a securing member through spacer 85. Here, as illustrated in FIG. 11 described later and the like, surface part fixing holes 42 are formed at the four corners of surface part fixing part 44 of movable body 40, and screw 84 is inserted to surface part fixing hole 42 and spacer 85 and threadedly engaged with the screw hole (the reference numeral is omitted) of movable panel 81. With fixing movable panel 81 fixed to movable body 40 in this manner, movable panel 81 and protruding part 82 vibrate together with movable body 40. In the present embodiment, movable body 40, movable panel 81 and protruding part 82 correspond to the movable body in the present invention.

Impact absorbing part 86 (the limiting part in the present invention) is provided at bottom surface 81b of movable panel 81. Here, impact absorbing part 86 is disposed at the four corner portions of bottom surface 81b, for example. More specifically, two impact absorbing parts 86 are disposed along the X direction on one end side (for example, the left end side in FIG. 4) in the Y direction in bottom surface 81b, and two impact absorbing parts 86 are disposed along the X direction on the other end side (for example, the right end side in FIG. 4) in the Y direction.

Impact absorbing part 86 is composed of a damper formed of an elastomer, for example. When this impact absorbing part 86 makes contact with projecting part 72, the movement (pushing) of movable panel 81 to the minus side in the Z direction during the vibration is suppressed, and the impact from movable panel 81 is absorbed.

In this manner, with impact absorbing part 86 and the above-described impact absorbing part 63, the movable range of movable panel 81 is limited. For example, in the case where vibration transmitting device 100 is mistakenly dropped when mounting vibration transmitting device 100, elastic part 50 described later of electromagnetic actuator 10 may be plastically deformed and damaged due to the impact of the drop if the movable range of movable panel 81 is not limited. On the other hand, in the present embodiment, plastic deformation and damage of elastic part 50 can be prevented since the impact is absorbed while limiting the movable range of movable panel 81.

In addition, if the impact from movable panel 81 is strong and housing lid part 60 and housing base part 70 directly receive the impact, housing lid part 60 and housing base part 70 may be cracked and damaged. On the other hand, in the present embodiment, the impact of movable panel 81 is received by impact absorbing part 63 and impact absorbing part 86 to absorb the impact, and thus the damages to housing lid part 60 and housing base part 70 can be prevented.

While the configuration of electromagnetic actuator 10 and the vibration of movable body 40 are described later, the vibration direction of movable body 40 is the Z direction, which is the direction perpendicular to the surface of opposing surface 61 disposed to face the user. In this manner, since the vibration direction of movable body 40 is the direction perpendicular to the surface of opposing surface 61, movable panel 81, i.e., protruding part 82 can be driven with strong vibration, and the strong vibration can be transmitted to the user in comparison with the case where the vibration direction is not the direction perpendicular to the surface. Thus, by vibrating movable body 40 by driving electromagnetic actuator 10 with vibration transmitting device 100 disposed such that protruding part 82 makes contact with a part of the user's body, the vibration can be reliably transmitted to the user through protruding part 82.

In addition, when electromagnetic actuator 10 is continuously driven, the heat may be generated by coil 22 described later making up electromagnetic actuator 10. Even when heat is generated by coil 22, the user and the object as the vibration transmission targets would not touch coil 22 in the present embodiment since electromagnetic actuator 10 is housed inside the housing part (housing lid part 60 and housing base part 70, for example. In this manner, the influence on the user and the like can be suppressed and the safety can be ensured.

Variation 1 of Vibration Transmitting Device 100

Figure 8:
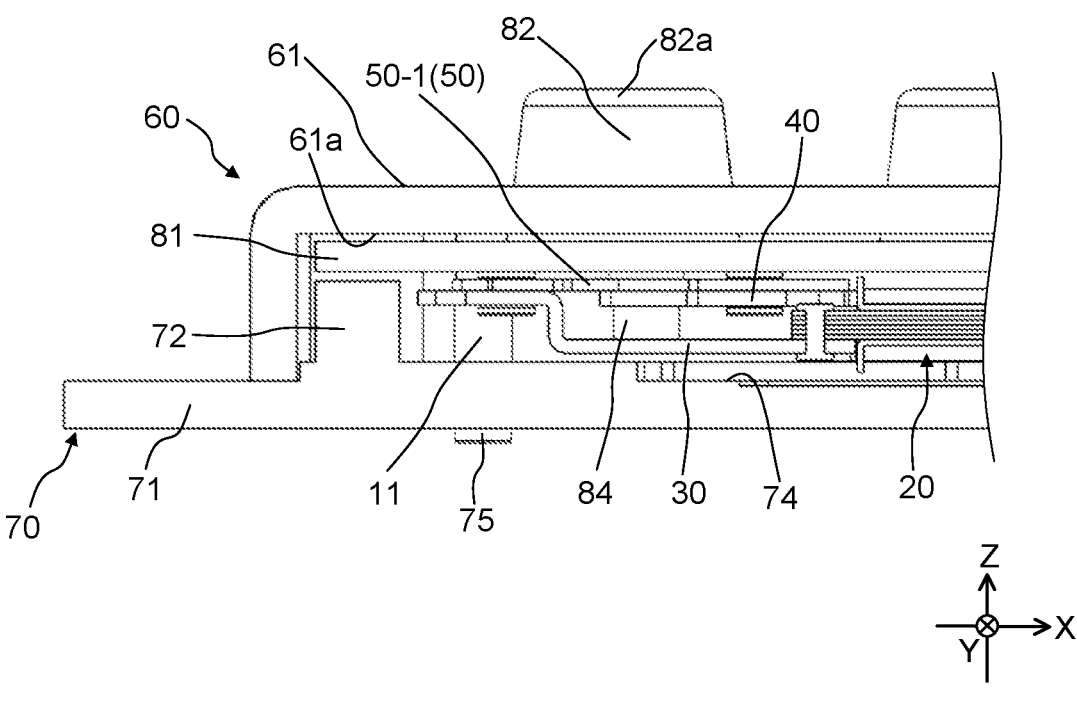
FIG. 8 is a diagram illustrating a variation (Variation 1) of the vibration transmitting device illustrated in FIG. 1.
Figure 9:
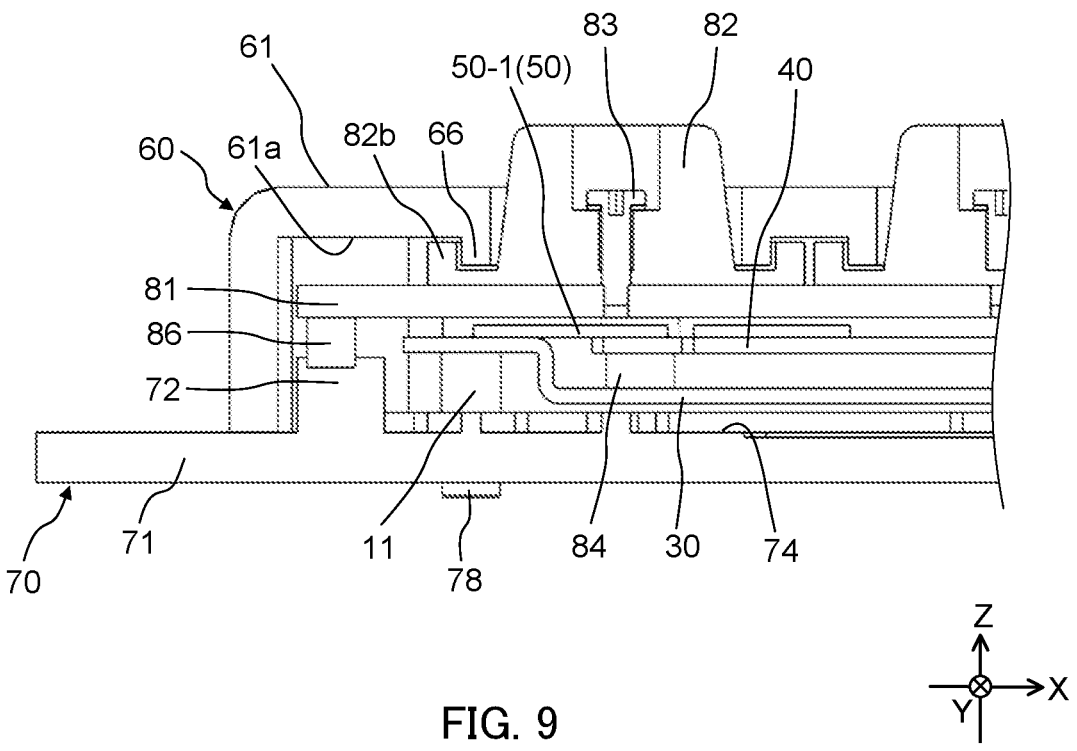
FIG. 9 is a diagram illustrating a variation (Variation 2) of the vibration transmitting device illustrated in FIG. 1.

In the present embodiment, as illustrated in FIG. 7, vibration transmitting device 100 includes the impact absorbing parts (impact absorbing part 63 and impact absorbing part 86) on both the plus side and minus side of movable panel 81 in the Z direction, but one or both the impact absorbing parts may not be provided. For example, as illustrated in FIG. 8, vibration transmitting device 100 may be configured without both impact absorbing part 63 and impact absorbing part 86. In addition, as illustrated in FIG. 9 described later, vibration transmitting device 100 may be configured with impact absorbing part 86 and without impact absorbing part 63.

In the configuration illustrated in FIG. 8, inner surface 61a (the limiting part in the present invention) of opposing surface 61 suppresses the movement (protrusion) of movable panel 81 to the plus side in the Z direction during the vibration. In addition, projecting part 72 (the limiting part in the present invention) of fixing plate 71 suppresses the movement (pushing) of movable panel 81 to the minus side in the Z direction during the vibration. In this case, the thickness of opposing surface 61 and the height of projecting part 72 are adjusted so that inner surface 61a and projecting part 72 can suppress the movement of movable panel 81 in the Z direction.

In the configuration illustrated in FIG. 9, inner surface 61a of opposing surface 61 and flange part 66 described later (the limiting part in the present invention) make contact with protruding part 82 side including flange part 82b described later and the like and thus suppress the movement (protrusion) of movable panel 81 to the plus side in the Z direction during the vibration. Regarding the movement (pushing) of movable panel 81 to the minus side in the Z direction during the vibration, impact absorbing part 86 suppresses the movement and absorbs the impact from movable panel 81 as in the configuration illustrated in FIG. 7. In this case, the thicknesses of opposing surface 61 and flange part 66 are adjusted so that inner surface 61a and flange part 66 can suppress the movement of movable panel 81 to the plus side in the Z direction.

Variation 2 of Vibration Transmitting Device 100

In the present embodiment, a gap is provided between protruding part 82 of transmitting part 80 (movable panel 81) and opening 62 of housing lid part 60, and a labyrinth structure may be provided at this gap. For example, as illustrated in FIG. 9, flange part 66 protruding to the minus side in the Z direction is formed at the edge of opening 62, and flange part 82b protruding to the plus side in the Z direction is formed to surround the periphery of flange part 66 and face the outer peripheral surface of flange part 66.

Note that in this case flange part 82b is provided at the outer periphery part of a lower portion of protruding part 82, but a flange part may be provided at movable panel 81. In addition, in this case a single labyrinth structure composed of flange part 66 and flange part 82b is provided, but a double or more labyrinth structure may be provided by providing a plurality of flange parts similar to flange part 66 and flange part 82b.

As illustrated in FIG. 9, by forming flange part 66 and flange part 82b, the labyrinth structure is formed between flange part 66 and flange part 82b. With this labyrinth structure, foreign matters such as dusts can be prevented from entering the inside of housing lid part 60 through opening 62. In this manner, the operation of electromagnetic actuator 10 can be stabilized.

Variation 3 of Vibration Transmitting Device 100

Figure 10:
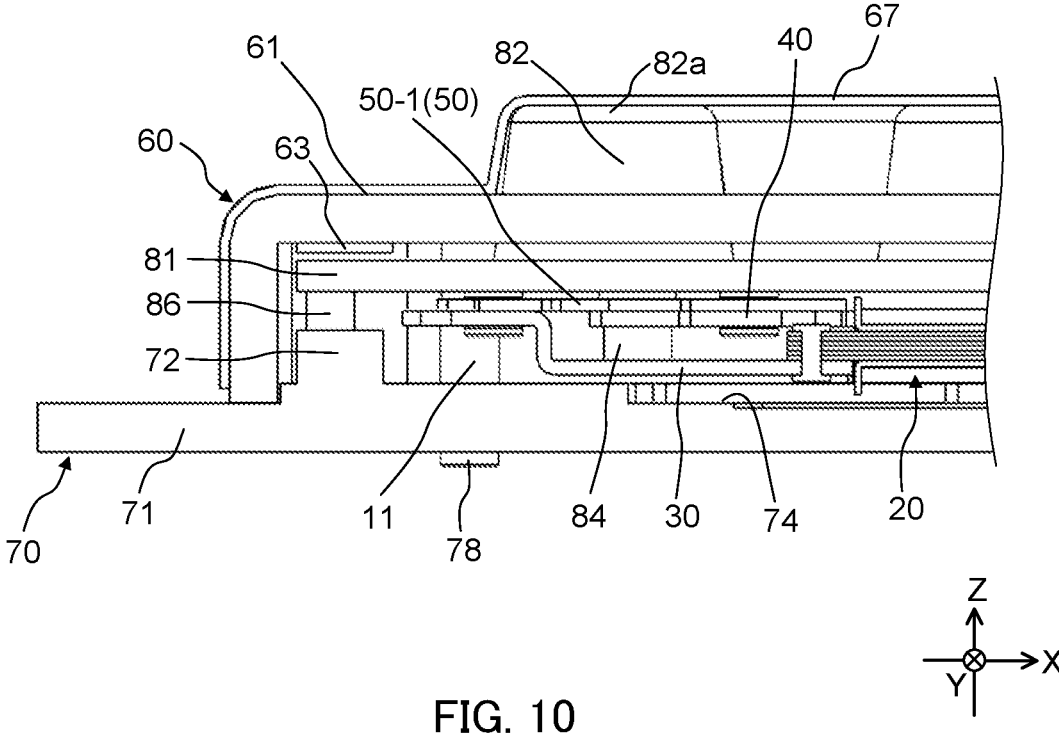
FIG. 10 is a diagram illustrating a variation (Variation 3) of the vibration transmitting device illustrated in FIG. 1.

While the labyrinth structure may be provided between opening 62 and protruding part 82 as illustrated in FIG. 9, extendable protective cover 67 that covers housing lid part 60 including opening 62 from the external side may be provided as illustrated in FIG. 10. By covering housing lid part 60 with protective cover 67, foreign matters such as dusts can be prevented from entering the inside of housing lid part 60 through opening 62. In this manner, the operation of electromagnetic actuator 10 can be stabilized. In addition, since protective cover 67 is stretchable, the vibration of protruding part 82 can be transmitted to the user without blocking it.

Electromagnetic Actuator 10

Electromagnetic actuator 10 provided in vibration transmitting device 100 is described below with reference to FIGS. 11 to 14.

Figure 12:
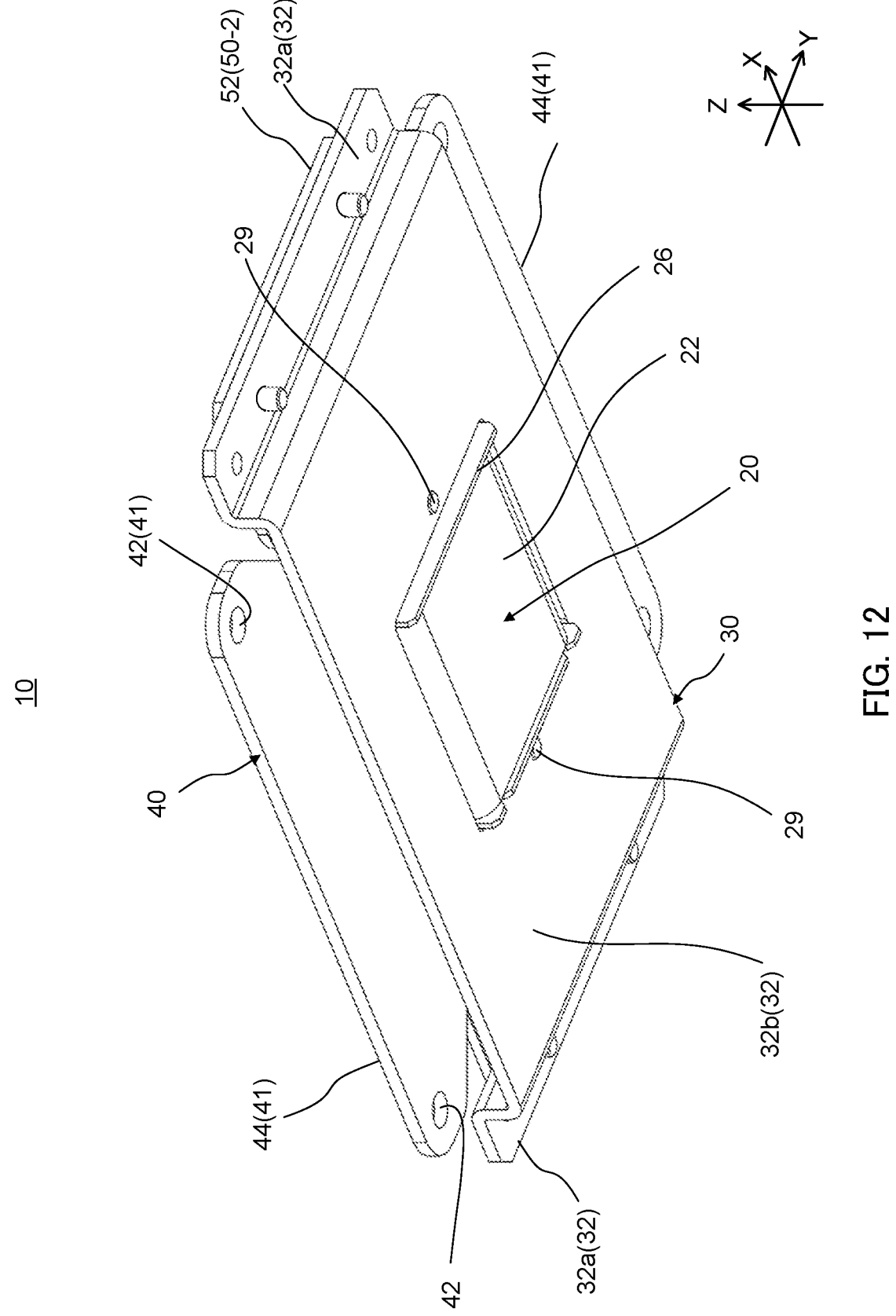
FIG. 12 is a perspective view of the electromagnetic actuator illustrated in FIG. 11, as viewed from an obliquely lower side.
Figure 13:
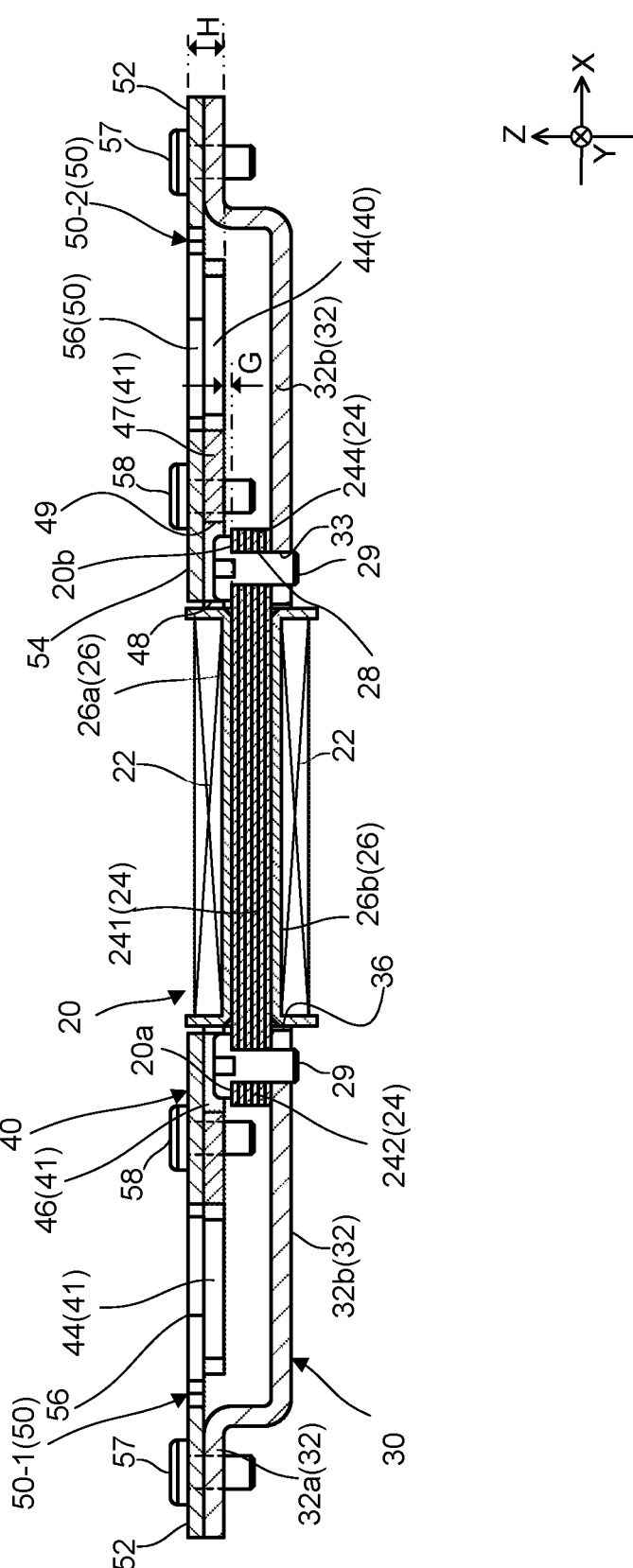
FIG. 13 is a sectional view of the electromagnetic actuator illustrated in FIG. 11 taken along line A-A.
Figure 14:
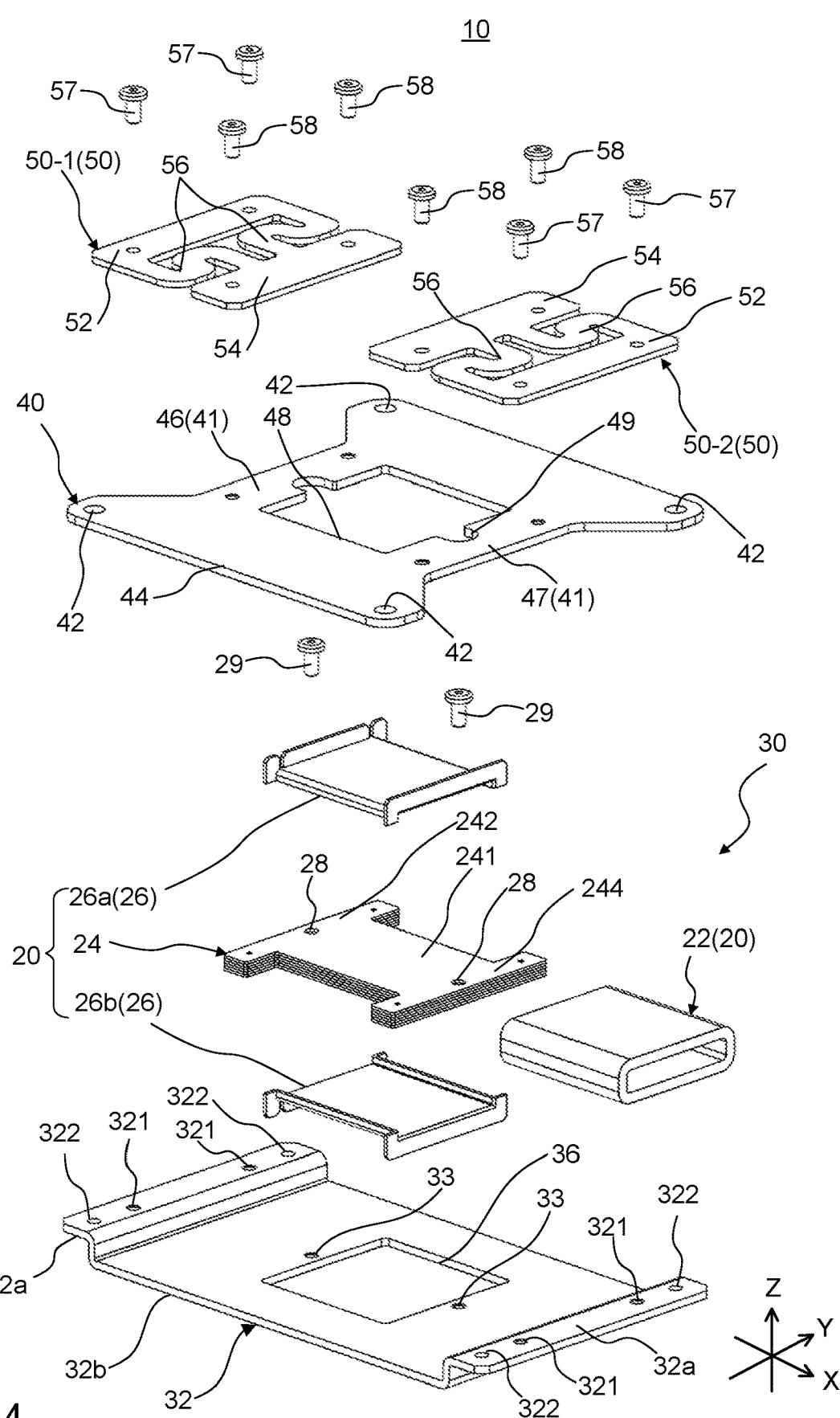
FIG. 14 is an exploded perspective view of the electromagnetic actuator illustrated in FIG. 11.

FIG. 11 is a perspective view of electromagnetic actuator 10 provided in vibration transmitting device 100, as viewed from an obliquely upper side. FIG. 12 is a perspective view of electromagnetic actuator 10, as viewed from an obliquely lower side. FIG. 13 is a sectional view of electromagnetic actuator 10 illustrated in FIG. 11 taken along line A-A. FIG. 14 is an exploded perspective view of electromagnetic actuator 10.

Electromagnetic actuator 10 functions as a vibration generation source of movable panel 81 including protruding part 82 (see FIGS. 2 to 7), and transmits vibration corresponding to the input driving signal to the user of vibration transmitting device 100 (for example, the user seated in seat 400 described later).

Electromagnetic actuator 10 includes fixing body 30 and movable body 40 where movable panel 81 is fixed. Movable body 40 is supported through elastic part 50 such that it can elastically vibrate respect to with fixing body 30. Electromagnetic actuator 10 linearly moves movable body 40 back and forth by driving movable body 40 in one direction and moving movable body 40 in the direction opposite to the one direction with the biasing force of elastic part 50 for generating a biasing force.

Here, the driving in one direction means driving movable body 40 in one direction of the vibration direction by exciting coil 22 described later at movable body 40 supported through elastic part 50 in a movable manner in the vibration direction with respect to fixing body 30. When movable body 40 is driven in one direction of the vibration direction in this manner, movable body 40 moves in the direction opposite to the one direction with the biasing force of elastic part 50 after the driving. Movable body 40 is vibrated by repeating such driving. The vibration of movable body 40 generated in the above-described manner provides very quick responsiveness up to the generation of the vibration after the input of the driving signal to coil 22, and is very effective for a case where a warning is desirably immediately noticed to the user by transmitting the vibration, and the like, for example.

As elaborated later, fixing body 30 includes core assembly 20 composed of coil 22 wound around core 24, and base part 32. In addition, movable body 40 includes yoke 41 composed of a magnetic member. Elastic part 50 (50-1, 50-2) elastically supports movable body 40 such that movable body 40 is movable in the vibration direction with respect to fixing body 30.

Electromagnetic actuator 10 drives, to move in one direction, movable body 40 movably supported by elastic part 50 with respect to fixing body 30. In addition, movable body 40 is moved in the direction opposite to the one direction with the biasing force of elastic part 50.

Specifically, electromagnetic actuator 10 vibrates yoke 41 of movable body 40 by means of core assembly 20. More specifically, movable body 40 is vibrated with the attraction force of energized coil 22 and core 24 excited by energized coil 22, and the biasing force of elastic part 50 (50-1, 50-2). In the present embodiment, electromagnetic actuator 10 is driven by the action of the electromagnet.

In addition, electromagnetic actuator 10 is configured in a flat shape with the Z direction as the thickness direction. Electromagnetic actuator 10 vibrates movable body 40 with respect to fixing body 30 in the Z direction, i.e., the thickness direction, as the vibration direction. In this manner, in electromagnetic actuator 10, one of the front and rear members (fixing body 30 and movable body 40) separated in the thickness direction of electromagnetic actuator 10 itself is brought closer to and separated from the other in the Z direction.

In the present embodiment, electromagnetic actuator 10 moves movable body 40 to the minus side in the Z direction as one direction with the attraction force of core 24, and moves movable body 40 to the plus side in the Z direction with the biasing force of elastic part 50 (50-1, 50-2).

In electromagnetic actuator 10 of the present embodiment, movable body 40 is elastically supported by a plurality of elastic parts 50 (50-1, 50-2) disposed along the direction orthogonal to the Z direction at a position point symmetrical with respect to the movement center of movable body 40.

Fixing Body 30

As illustrated in FIGS. 13 and 14, fixing body 30 includes core assembly 20 including coil 22 and core 24, and base part 32.

Base part 32, to which core assembly 20 is fixed, supports movable body 40 through elastic part 50 (50-1, 50-2) such that movable body 40 can freely vibrate. Base part 32 is a member with a flat shape, and forms the bottom surface of electromagnetic actuator 10. Base part 32 includes, with core assembly 20 sandwiched therebetween, attaching parts 32a to which one end portion of elastic parts 50 (50-1, 50-2) is fixed. Attaching parts 32a are disposed with the same distance from core assembly 20. Note that this distance serves as the deformation region of elastic part 50 (50-1, 50-2).

As illustrated in FIG. 14, attaching part 32a includes fixing hole 321 for fixing elastic part 50 (50-1, 50-2), and fixing hole 322 for fixing base part 32 to fixing plate 71 (see FIG. 3 and the like) of housing base part 70. Fixing holes 322 are provided at both end portions in attaching part 32a with fixing hole 321 sandwiched therebetween, and are each fixed to fixing plate 71 through cylindrical support column 11 as illustrated in FIGS. 2 to 6. In this manner, base part 32 is fixed to fixing plate 71 (see FIG. 3 and the like) in a stable manner in its entirety.

In the present embodiment, base part 32 is configured by processing a sheet metal such that one side portion and the other side portion as attaching parts 32a are separated from each other in the width direction (the X direction) with bottom surface part 32b sandwiched therebetween. A recessed part including bottom surface part 32b with a lower height than attaching part 32a is provided between attaching parts 32a. The inside of the recessed part, i.e., the space on the front surface side of bottom surface part 32b is for ensuring the elastic deformation region of elastic part 50 (50-1, 50-2), and is a space for ensuring the movable region of movable body 40 supported by elastic part 50 (50-1, 50-2).

Bottom surface part 32b has a rectangular shape, and opening 36 is formed at its center portion. Core assembly 20 is located inside opening 36.

Core assembly 20 is fixed inside opening 36 in a partially inserted state. More specifically, divided member 26b of bobbin 26 on the lower side of core assembly 20 and a lower portion of coil 22 are inserted inside opening 36, and fixed such that core 24 is located above bottom surface part 32b in side view.

In this manner, the length in the Z direction is smaller (the thickness is smaller) in comparison with the configuration in which core assembly 20 is attached above bottom surface part 32b. In addition, a part of core assembly 20, or in this case a part of the bottom surface side, is fixed in the state of being fit in opening 36, and thus core assembly 20 is firmly fixed in the state where it is less detached from bottom surface part 32b.

Opening 36 has a shape corresponding to the shape of core assembly 20. In the present embodiment, opening 36 is formed in a square shape. In this manner, electromagnetic actuator 10 can have a substantially square shape in its entirety in plan view with core assembly 20 and movable body 40 disposed at a center portion of electromagnetic actuator 10. Note that opening 36 may have a rectangular shape (including a square shape).

Core assembly 20 vibrates (linearly moves back and forth) yoke 41 of movable body 40 in the Z direction in conjunction with elastic part 50 (50-1, 50-2).

In the present embodiment, core assembly 20 is formed in a rectangular plate-shape, and magnetic pole parts 242 and 244 are disposed at both side portions separated in the longitudinal direction (the X direction) in the rectangular plate-shape.

Magnetic pole parts 242 and 244 are disposed close to the bottom surfaces of attracted surface parts 46 and 47 of movable body 40 so as to face the bottom surfaces with gap G (see FIG. 13) therebetween in the Z direction. In magnetic pole parts 242 and 244, the opposing surfaces (opposing surface part) 20a and 20b as the top surfaces face the bottom surfaces of attracted surface parts 46 and 47 of yoke 41 in the vibration direction of movable body 40.

Core assembly 20 is configured with coil 22 wound around the outer periphery of core 24 through bobbin 26. As illustrated in FIGS. 13 and 14, core assembly 20 is fixed to base part 32 with the winding axis of coil 22 set in the direction in which attaching parts 32a separated in base part 32 face each other. In the present embodiment, core assembly 20 is disposed at a center portion of base part 32, or more specifically at a center portion of bottom surface part 32b.

As illustrated in FIG. 13, core assembly 20 is fixed to bottom surface part 32b such that core 24 is located parallel to bottom surface part 32b across opening 36 on the bottom surface. Core assembly 20 is fixed with screw 29 as a securing member in the state where coil 22 and the portion (core body 241) wound around coil 22 are located inside opening 36 of base part 32 (see FIGS. 12 to 14).

More specifically, core assembly 20 is fixed to bottom surface part 32b in the state where coil 22 is disposed inside opening 36 by fastening screw 29 through fixing hole 28 and securing hole 33 of bottom surface part 32b (see FIG. 14). Core assembly 20 and bottom surface part 32b are joined at two locations on the axial core of coil 22 with coil 22 therebetween by means of screw 29 at both sides of opening 36 separated in the X direction and magnetic pole parts 242 and 244.

Coil 22 is a solenoid that generates a magnetic field by being energized when driving electromagnetic actuator 10. Together with core 24 and movable body 40, coil 22 makes up a magnetic circuit (magnetic path) for pulling and moving movable body 40. When a driving signal is supplied to coil 22 from drive control parts 110A to 110E (see FIGS. 17 to 21) described later, the power is supplied to coil 22, and thus electromagnetic actuator 10 is driven.

Core 24 includes core body 241 around which coil 22 is wound, and magnetic pole parts 242 and 244 disposed at both end portions of core body 241 and configured to be excited through energization of coil 22.

The structure of core 24 is not limited as long as the structure has a length with which both end portions serve as magnetic pole parts 242 and 244 through energization of coil 22. For example, core 24 of the present embodiment is formed in an H-shaped plate shape in plan view although it may be formed in a straight-shaped (I-shaped) plate shape. In comparison with the I-shaped core, the H-shaped core has a shape in which the gap side surface is elongated and extended in the front-rear direction (the Y direction) at both end portions of core body 241 than the width of the core body around which coil 22 is wound.

In this manner, with the H-shaped core, the efficiency of the magnetic circuit can be improved by reducing the magnetic resistance than using the I-shaped core. In addition, coil 22 can be positioned by only fitting bobbin 26 between the portions extended from core body 241 at magnetic pole parts 242 and 244, and thus it is not necessary to additionally provide the member for positioning bobbin 26 with respect to core 24.

In core 24, magnetic pole parts 242 and 244 are provided to protrude in the direction orthogonal to the winding axis of coil 22 at respective both end portions of plate-shaped core body 241 around which coil 22 is wound.

Core 24 is a magnetic member formed of a silicon steel sheet, permalloy, ferrite or the like, for example. In addition, core 24 may be composed of an electromagnetic stainless-steel, a sintered material, an MIM (metal injection mold) material, a laminated steel sheet, an electro-galvanized steel sheet (SECC) or the like.

Magnetic pole parts 242 and 244 are protruded in the Y direction from both openings of coil 22.

Magnetic pole parts 242 and 244 attract and move yoke 41 of movable body 40 separated in the vibration direction (the Z direction) by being excited through energization to coil 22. More specifically, with the generated magnetic flux, magnetic pole parts 242 and 244 attract attracted surface parts 46 and 47 of movable body 40 disposed in a facing manner with gap G therebetween.

Magnetic pole parts 242 and 244 are plate-shaped members extending in the Y direction, which is the direction perpendicular to core body 241 extending in the X direction. Magnetic pole parts 242 and 244 are elongated in the Y direction, and therefore the areas of opposing surfaces 20a and 20b facing yoke 41 are greater than in a configuration in which they are formed at both end portions of core body 241.

Magnetic pole parts 242 and 244 are provided with fixing hole 28 formed at a center portion in the Y direction, and are fixed to base part 32 by means of screw 29 inserted to fixing hole 28.

Bobbin 26 is disposed to surround core body 241 of core 24. Bobbin 26 is formed of a resin material, for example. In this manner, electric insulation with other metal members (such as core 24) can be ensured, thus improving the reliability as an electric circuit. By using high-flow resins for the resin material, the workability is improved and the thickness can be reduced while ensuring the strength of bobbin 26.

Note that bobbin 26 is formed as a cylindrical member to cover the periphery of core body 241 with divided members 26a and 26b assembled to sandwich core body 241. Note that bobbin 26 is provided with a flange at both end portions of the cylindrical member to define it such that coil 22 is located on the outer periphery of core body 241.

Movable Body 40

Movable body 40 is disposed in a facing manner at core assembly 20 with gap G therebetween in the direction orthogonal to the vibration direction (the Z direction). Movable body 40 is provided so as to be movable back and forth in the vibration direction with respect to core assembly 20.

Movable body 40 includes yoke 41, and movable body side fixing part 54 of elastic parts 50-1 and 50-2 fixed to yoke 41. Movable body 40 is disposed through elastic part 50 (50-1, 50-2) so as to be movable in the approaching or separating direction (the Z direction) with respect to bottom surface part 32b in a state of being suspended in an approximately parallel manner with a space therebetween (reference state position).

Yoke 41 is a plate-shaped member composed of a magnetic member such as an electromagnetic stainless-steel, a sintered material, a MIM (metal injection mold) material, a laminated steel sheet, and an electro-galvanized steel sheet (SECC). In the present embodiment, yoke 41 is formed by processing an SECC plate.

With elastic part 50 (50-1, 50-2) fixed to attracted surface parts 46 and 47 separated in the X direction, yoke 41 is suspended in a facing manner with respect to core assembly 20 with gap G (see FIG. 13) therebetween in the vibration direction (the Z direction).

Yoke 41 includes surface part fixing part 44 where movable panel 81 is attached, and attracted surface parts 46 and 47 disposed opposite to magnetic pole parts 242 and 244.

In the present embodiment, yoke 41 is formed in a rectangular frame shape with surface part fixing part 44 and attracted surface parts 46 and 47 surrounding center portion opening 48.

Opening 48 faces coil 22. In the present embodiment, opening 48 is located directly above coil 22, and the opening of opening 48 is formed in a shape to which the portion of coil 22 of core assembly 20 can be inserted when yoke 41 moves to bottom surface part 32b side. With the configuration of yoke 41 including opening 48, the thickness of the entirety of the electromagnetic actuator can be reduced in comparison with the case where no opening 48 is provided.

In addition, since core assembly 20 is located in opening 48, yoke 41 is not disposed near coil 22 in comparison with the distance (gap G) between magnetic pole parts 242 and 244 of core body 241 and attracted surface parts 46 and 47 of yoke 41. Thus, the reduction in conversion efficiency due to the leaked magnetic flux leaked from coil 22 can be suppressed, and high output can be achieved.

Surface part fixing part 44 includes fixing surface 44a for fixing movable panel 81. Fixing surface 44a fixes movable panel 81 at a position surrounding core assembly 20 by means of screw 84 as a securing member inserted to surface part fixing hole 42.

Attracted surface parts 46 and 47, where elastic part 50 (50-1, 50-2) is fixed, are attracted by magnetic pole parts 242 and 244 magnetized at core assembly 20.

Movable body side fixing parts 54 of elastic parts 50-1 and 50-2 are fixed in a stacked manner to attracted surface parts 46 and 47, respectively. Attracted surface parts 46 and 47 are provided with notch part 49 for escape of screw 29 of core assembly 20 when moved to bottom surface part 32b side.

In this manner, even when movable body 40 moves to bottom surface part 32b side and attracted surface parts 46 and 47 are brought closer to magnetic pole parts 242 and 244, they do not make contact with screw 29 for fixing magnetic pole parts 242 and 244 to bottom surface part 32b, and thus the movable region of yoke 41 in the Z direction can be correspondingly ensured.

Elastic Part 50

Elastic part 50 (50-1, 50-2) movably supports movable body 40 with respect to fixing body 30. Elastic part 50 (50-1, 50-2) is configured in an elastically-deformable plate-shape. Elastic part 50 (50-1, 50-2) may not have the plate shape, and may be an elastic body of any shapes and materials as long as movable body 40 driven in one direction in the vibration direction can be supported with respect to fixing body 30.

Elastic part 50 (50-1, 50-2) supports movable body 40 such that the top surface of movable body 40 is at the same height as the top surface of fixing body 30, or on the bottom surface side than the top surface of fixing body 30 (in the present embodiment, the top surface of core assembly 20), and that they are parallel to each other. Note that elastic parts 50-1 and 50-2 are members with shapes symmetric about the center of movable body 40, and are, in the present embodiment, formed in the same manner.

Elastic part 50 sets yoke 41 in an approximately parallel manner and in a facing manner with gap G therebetween with respect to magnetic pole parts 242 and 244 of core 24 of fixing body 30. Elastic part 50 supports movable body 40 such that the bottom surface of movable body 40 is on the bottom surface part 32b side than substantially the same level as the height level of the top surface of core assembly 20 and that it is movable in the vibration direction.

In this case, elastic part 50 is a leaf spring including fixing body side fixing part 52, movable body side fixing part 54, and meandering elastic arm part 56 that bridges between fixing body side fixing part 52 and movable body side fixing part 54, for example.

Elastic part 50 attaches movable body 40 by attaching fixing body side fixing part 52 to the surface of attaching part 32a, and attaching movable body side fixing part 54 to the surfaces of attracted surface parts 46 and 47 of yoke 41 such that meandering elastic arm part 56 is parallel to bottom surface part 32b.

Fixing body side fixing part 52 is fixed in surface contact with attaching part 32a by means of screw 57, and movable body side fixing part 54 is fixed in surface contact with attracted surface parts 46 and 47 by means of screw 58.

Meandering elastic arm part 56 is an arm part with a meandering shape part. With the meandering shape part, meandering elastic arm part 56 ensures a length that allows for deformation required for the vibration of movable body 40 at the surface orthogonal to the vibration direction (the surface formed in the X direction and the Y direction) between fixing body side fixing part 52 and movable body side fixing part 54.

In the present embodiment, meandering elastic arm part 56 is extended and folded in the opposing direction of fixing body side fixing part 52 and movable body side fixing part 54, the end portions joined to fixing body side fixing part 52 and movable body side fixing part 54 are shifted in the Y direction. Meandering elastic arm part 56 is disposed at a position point symmetrical or line symmetrical about the center of movable body 40.

In this manner, movable body 40 is supported on both sides by means of meandering elastic arm part 56 including the spring with the meandering shape, and thus stress dispersion during elastic deformation can be achieved. That is, elastic part 50 can move movable body 40 in the vibration direction (the Z direction) without tilting it with respect to core assembly 20, and thus the reliability of the vibration state can be improved.

Each elastic part 50 includes at least two meandering elastic arm parts 56. In this manner, in comparison with the case where one meandering elastic arm part 56 is provided in each part, the stress during elastic deformation is dispersed, and the reliability can be improved, and, the balance of the support for movable body 40 is improved, thus improving the stability.

The leaf spring serving as elastic part 50 may be either non-magnetic or magnetic. In addition, movable body side fixing part 54 of elastic part 50 is disposed at the opposite position or the position on the upper side in the winding axis direction of coil 22 with respect to both end portions (magnetic pole parts 242 and 244) of core 24, and makes up a magnetic path together with core 24 when coil 22 is energized.

In the case where elastic part 50 is composed of a magnetic member, movable body side fixing part 54 is fixed in a stacked manner on the upper side of attracted surface parts 46 and 47. In this manner, the thickness H (see FIG. 13) of attracted surface parts 46 and 47 facing magnetic pole parts 242 and 244 of the core assembly can be increased as the thickness of the magnetic member. The thickness of elastic part 50 and the thickness of yoke 41 are the same, and thus the cross-sectional area of the portion of the magnetic member facing magnetic pole parts 242 and 244 can be doubled. In this manner, in comparison with a case where the leaf spring is a non-magnetic member, the magnetic circuit can be expanded and the property degradation due to magnetic saturation in the magnetic circuit can be suppressed, thus improving the output.

Note that in electromagnetic actuator 10, it is possible to provide a detection part for detecting the pushing amount of the user pushing movable body 40 through movable panel 81 and protruding part 82, so as to generate the vibration based on the pushing amount and the input driving signal.

For example, as the detection part for detecting the pushing amount, a sensor for detecting the distortion of elastic part 50 may be provided.

FIG. 15 is a diagram illustrating a magnetic circuit of electromagnetic actuator 10. Note that FIG. 15 is a perspective view of electromagnetic actuator 10 taken along line A-A of FIG. 11, and, also in the portion not illustrated in the drawing, the magnetic circuit has the same magnetic flux flow M as that of the illustrated portion. In addition, FIG. 16 is a diagram for describing an operation of electromagnetic actuator 10, and is a sectional view schematically illustrating a movement of movable body 40 by the magnetic circuit. Specifically, FIG. 16A is a diagram illustrating a state where movable body 40 is held by elastic part 50 at a position separated from core assembly 20, and FIG. 16B is a diagram illustrating a state where movable body 40 is attracted and moved to core assembly 20 side by a magnetomotive force of the magnetic circuit.

More specifically, when coil 22 is energized, core 24 is excited to generate a magnetic field, and both end portions of core 24 become magnetic poles. For example, in core 24, magnetic pole part 242 becomes the N electrode and magnetic pole part 244 becomes the S pole as illustrated in FIG. 15. Then, a magnetic circuit indicated by magnetic flux flow M is formed between core assembly 20 and yoke 41. Magnetic flux flow M in the magnetic circuit flows from magnetic pole part 242 to attracted surface part 46 of opposite yoke 41 and passes through surface part fixing part 44 of yoke 41 to go from attracted surface part 47 to magnetic pole part 244 facing attracted surface part 47.

In the case where elastic part 50 is composed of a magnetic member, elastic part 50 is also a magnetic member, and therefore the magnetic flux flown to attracted surface part 46 (indicated by magnetic flux flow M) passes through attracted surface part 46 of yoke 41 and movable body side fixing part 54 of elastic part 50-1. Then, the magnetic flux goes from both ends of attracted surface part 46 to attracted surface part 47 and both ends of movable body side fixing part 54 of elastic part 50-2 through surface part fixing part 44.

In this manner, by the principle of an electromagnetic solenoid, magnetic pole parts 242 and 244 of core assembly 20 generate pulling force F of pulling and attracting attracted surface parts 46 and 47 of yoke 41. Then, attracted surface parts 46 and 47 of yoke 41 are attracted by both of magnetic pole parts 242 and 244 of core assembly 20. Additionally, movable body 40 including yoke 41 moves in F direction against the biasing force of elastic part 50 (see FIGS. 16A and 16B).

In addition, when the energization to coil 22 is released, the magnetic field is eliminated, and pulling force F of core assembly 20 for movable body 40 is eliminated, thus moving it in the direction to the original position (the movement in-F direction) by the biasing force of elastic part 50.

By repeating this operation, electromagnetic actuator 10 generates the vibration in the vibration direction (the Z direction) by linearly moving movable body 40 back and forth in the Z direction.

By linearly moving movable body 40 back and forth, movable panel 81 and protruding part 82 fixed to movable body 40 are also displaced in the Z direction following movable body 40.

In electromagnetic actuator 10, core assembly 20 including core 24 with wound coil 22 is fixed to fixing body 30. Core assembly 20 is disposed in opening 48 of yoke 41 of movable body 40 supported by elastic part 50 in a movable manner in the Z direction with respect to fixing body 30.

In this manner, it is not necessary to provide the members provided in fixing body 30 and movable body 40 in an overlapping manner in the Z direction (for example, it is not necessary to dispose coil 22 and yoke 41 as a magnetic member so as to face each other in the Z direction). Thus, the thickness in the Z direction as electromagnetic actuator 10 can be reduced. In addition, vibration can be applied to movable panel 81 and protruding part 82 by linearly moving movable body 40 back and forth without using a magnet.

In this manner, in electromagnetic actuator 10, the design is simple because the support structure is simple, and space-saving can be achieved, thus reducing the thickness of the electromagnetic actuator 10. In addition, since the magnet is not used, the cost can be reduced in comparison with a vibration device using a magnet (a so-called actuator).

Note that the above-described electromagnetic actuator 10 is an example of the configuration of driving in one direction, and the configuration of electromagnetic actuator 10 is not limited as long as it is a configuration of driving in one direction.

In addition, preferably, a plurality of elastic parts 50 is disposed at a position symmetric about the center of movable body 40 in electromagnetic actuator 10, but movable body 40 may be supported with one elastic part 50 such that movable body 40 can vibrate with respect to fixing body 30. In this case, one elastic part 50 supports movable body 40 with respect to fixing body 30 in a direction opposite to at least one end portion of both end portions of movable body 40.

In addition, in electromagnetic actuator 10, screws 57 and 58 are used to fix base part 32 and elastic part 50, and fix elastic part 50 and movable body 40. In this manner, elastic part 50, which is required to be firmly fixed to fixing body 30 and movable body 40 for movable body 40 to drive, can be mechanically firmly fixed in a state of allowing for rework.

Note that a rivet may be used instead of screws 57 and 58 used for fixing base part 32 and elastic part 50, and fixing elastic part 50 and movable body 40. The rivet is composed of a head and a screw-less barrel part, and joins members provided with holes, by being inserted to the members provided with holes and plastically deformed and crimped at the opposite end. The crimping may be performed by using a pressing machine, a dedicated tool and the like, for example.

Driving Principle of Electromagnetic Actuator 10

A driving principle of electromagnetic actuator 10 is briefly described below. Electromagnetic actuator 10 is driven with pulses supplied, based on the following Equation of Motion 1 and Circuit Equation 2. In the present embodiment, it is driven by inputting short pulses, but it may be driven to generate given vibration without using short pulses.

Note that movable body 40 in electromagnetic actuator 10 moves back and forth based on Equations 1 and 2.

[1]

$$m\frac{d^2 x(t)}{dt^2} = K_f i(t) - K_{sp}x(t) - D\frac{dx(t)}{dt} \qquad \text{(Equation 1)}$$

m: mass [kg]
x(t): displacement [m]
$K_f$: thrust constant [N/A]
i(t): current [A]
$K_{sp}$: spring constant [N/m]
D: attenuation coefficient [N/(m/s)]

[2]

$$e(t) = Ri(t) + L\frac{di(t)}{dt} + K_e\frac{dx(t)}{dt}$$   (Equation 2)

e(t): voltage [V]
R: resistance [Ω]
L: inductance [H]
$K_e$: counter electromotive force constant [V/(rad/s)]
    Mass m [Kg], displacement x(t) [m], thrust constant $K_f$ [N/A], current i(t) [A], spring constant $K_{sp}$ [N/m], attenuation coefficient D [N/(m/s)] and the like in electromagnetic actuator 10 may be appropriately changed as long as Equation of Motion 1 is satisfied. In addition, voltage e(t) [V], resistance R [Ω], inductance L [H], and counter electromotive force constant $K_e$ [V/(rad/s)] may be appropriately changed as long as Circuit Equation 2 is satisfied.
    In this manner, electromagnetic actuator 10 is determined by mass m of movable body 40 and spring constant $K_{sp}$ of the metal spring (elastic body; in the present embodiment, the leaf spring) as elastic part 50.
Example Configuration 1 of Vibration Transmitting Unit
    FIG. 17 is a diagram for describing vibration transmitting unit 300A. Drive control part 110A illustrated in FIG. 17 is an example of the driving circuit for driving and controlling electromagnetic actuator 10.
    Vibration transmitting unit 300A includes vibration transmitting device 100 (electromagnetic actuator 10), drive control part 110A, and signal generation part (Signal generation) 120A.
    Drive control part 110A includes switching element 111 composed of a MOSFET (metal-oxide-semiconductor field-effect transistor), resistors R1 and R2, and an SBD (Schottky Barrier Diodes: shot key barrier diode).
    Signal generation part 120A connected to power source voltage Vcc is connected to the gate of switching element 111. Switching element 111 is a discharge changeover switch. Switching element 111 is connected to electromagnetic actuator 10 and the SBD, and to electromagnetic actuator 10 to which a voltage is supplied from power source part Vact.
    With the above-mentioned configuration, signal generation part 120A functions as a voltage pulse application part that applies voltage pulses to switching element 111. Switching element 111 to which a voltage pulse is applied from signal generation part 120A functions as a current pulse supply part that supplies a current pulse to electromagnetic actuator 10. This current pulse serves as a driving signal for driving electromagnetic actuator 10. Thus, in accordance with the voltage pulse generated by signal generation part 120A, switching element 111 can generate and supply a current pulse to electromagnetic actuator 10.
    Although not illustrated in the drawings, vibration transmitting unit 300A may include a central processing unit (CPU) for driving and controlling electromagnetic actuator 10, a read only memory (ROM), a random access memory (RAM) and the like.
    In this case, the CPU reads a program corresponding to the processing content from the ROM and loads it in the RAM, and drive control part 110A and signal generation part 120A drive and control electromagnetic actuator 10 in conjunction with the loaded program. For example, the CPU refers to various data such as signal patterns (for example, a signal pattern for generating a current pulse to be supplied to electromagnetic actuator 10) stored in the ROM and the storage part (not illustrated). Note that the storage part may be composed of a nonvolatile semiconductor memory (so-called flash memory) or the like, for example.
    On the basis of the signal pattern read from the ROM or the like, drive control part 110A and signal generation part 120A generate a voltage pulse and a current pulse and supply the generated current pulse to electromagnetic actuator 10 (coil 22) to drive movable body 40 in one direction of the vibration direction.
    By supplying the current pulse to coil 22, movable body 40 is displaced in one direction of the vibration direction against the biasing force of elastic part 50. While the current pulse is being supplied, the displacement of movable body 40 in one direction of the vibration direction is continued.
    Then, when the supply of current pulse is stopped, i.e., the input of the current pulse to coil 22 is turned off, the displacing force of movable body 40 in one direction of the vibration direction (the Z direction) is released. Turning off of the input of the current pulse means the timing when the voltage that generates the current pulse is turned off. At the time point when the voltage is turned off, the current pulse is not completely off but is in an attenuated state.
    With the biasing force of elastic part 50 accumulated at the maximum displaceable position in the pulling direction (the minus side in the Z direction), movable body 40 is moved and displaced in the other direction in the vibration direction (the plus side in the Z direction). The strong vibration can be transmitted to the user by movable body 40 moved to the plus side in the Z direction.
    In this manner, drive control part 110A supplies one or more current pulses to coil 22 on the basis of the signal pattern to adjust the intensity and pattern of the vibration to be transmitted to the user. For example, drive control part 110A adjusts the intensity and pattern of the vibration of movable body 40 by supplying a first current pulse (main drive pulse), and adjusting the vibration and the like remaining after the stop of the supply of the first current pulse by the subsequently supplied current pulse (sub drive pulse).
    The intensity and pattern of the vibration can be adjusted by using, as the sub drive pulse, a brake pulse for shortening the attenuation period of the vibration attenuating after the vibration of the main drive pulse, an attenuation adding pulse for continuing the attenuation period of the vibration after the vibration of the main drive pulse, and the like, for example.
    In this configuration example, by storing a signal pattern suitable for warning notification in the ROM and the like, strong vibration can be transmitted to the user to reliably transmit a warning to the user when it is necessary to notice a warning to the user, for example. In addition, by storing a signal pattern suitable for massage, or more specifically, a signal pattern suitable for the portion to be massaged in the ROM and the like, the massage suitable for the user's symptom can be performed by selecting the signal pattern suitable for the portion to be massaged.
Example Configuration 2 of Vibration Transmitting Unit
    FIG. 18 is a diagram for describing vibration transmitting unit 300B. Drive control part 110B illustrated in FIG. 18 is an example of the driving circuit for driving and controlling electromagnetic actuator 10.
    Vibration transmitting unit 300B illustrated in FIG. 18 includes vibration transmitting device 100 (electromagnetic actuator 10), signal input part 120B, and drive control part 110B interposed between signal input part 120B and electromagnetic actuator 10. An alternating current signal, e.g., an alternating current signal from an audio sound source, is input to signal input part 120B.

Drive control part 110B is a half-wave rectifier circuit including rectification diode 112 inserted in the forward direction between signal input part 120B and electromagnetic actuator 10.

As such, drive control part 110B that functions as a half-wave rectifier circuit performs half-wave rectification for the input alternating current signal, and inputs it into electromagnetic actuator 10 as a driving signal. As described above, electromagnetic actuator 10 vibrates movable body 40, which is supported such that it can elastically vibrate, by driving it in one direction. Therefore, by inputting the half-wave rectified driving signal into electromagnetic actuator 10, drive control part 110B can generate at electromagnetic actuator 10 vibration synchronized to the frequency (period) of the input alternating current signal.

In this manner, by using rectification diode 112, the vibration synchronized to the frequency of the input alternating current signal can be generated in a cost-effective manner. In the half-wave rectifier circuit illustrated in FIG. 18, rectification diode 112 is inserted in the forward direction from signal input part 120B to electromagnetic actuator 10, and thus the above-described effects can be achieved with a simple configuration.

Example Configuration 3 of Vibration Transmitting Unit

FIG. 19 is a diagram for describing vibration transmitting unit 300C. Drive control part 110C illustrated in FIG. 19 is an example of the driving circuit for driving and controlling electromagnetic actuator 10.

Vibration transmitting unit 300C illustrated in FIG. 19 includes vibration transmitting device 100 (electromagnetic actuator 10), signal input part 120B, and drive control part 110C interposed between signal input part 120B and electromagnetic actuator 10.

Drive control part 110C includes a half-wave rectification protection circuit including rectification diode 112 and free wheel diode 113. In drive control part 110C, rectification diode 112 is inserted in the forward direction between signal input part 120B and electromagnetic actuator 10. Additionally, in drive control part 110C, free wheel diode 113 is inserted in parallel to electromagnetic actuator 10 between the terminals of electromagnetic actuator 10.

As such, drive control part 110C that functions as a half-wave rectification protection circuit performs half-wave rectification for the input alternating current signal and inputs it into electromagnetic actuator 10 as a driving signal. In this manner, drive control part 110C can generate at electromagnetic actuator 10 vibration synchronized to the frequency of the input alternating current signal.

In addition, free wheel diode 113 functions as a protection circuit of rectification diode 112. Therefore, even in the case where a counter electromotive force is generated in electromagnetic actuator 10, the high voltage is not applied to the rectification diode, and the rectification diode can be protected from damages due to the high voltage application.

Example Configuration 4 of Vibration Transmitting Unit

FIG. 20 is a diagram for describing vibration transmitting unit 300D. Drive control part 110D illustrated in FIG. 20 is an example of the driving circuit for driving and controlling electromagnetic actuator 10.

Vibration transmitting unit 300D illustrated in FIG. 20 includes vibration transmitting device 100 (electromagnetic actuator 10), signal input part 120B, and drive control part 110D interposed between signal input part 120B and electromagnetic actuator 10.

Drive control part 110D includes a half-wave rectification protection circuit including rectification diode 112, free wheel diode 113 and resistor 114. In drive control part 110D, rectification diode 112 is inserted in the forward direction between signal input part 120B and electromagnetic actuator 10. Additionally, in drive control part 110C, resistor 114 is connect to free wheel diode 113 and inserted in parallel to electromagnetic actuator 10 between the terminals of electromagnetic actuator 10.

As such, drive control part 110D that functions as a half-wave rectification protection circuit performs half-wave rectification for the input alternating current signal and inputs it into electromagnetic actuator 10 as a driving signal. In this manner, drive control part 110D can generate at electromagnetic actuator 10 vibration synchronized to the frequency of the input alternating current signal. In addition, free wheel diode 113 and resistor 114 function as protection circuits of rectification diode 112.

Unlike a protection circuit that protects rectification diode 112 with free wheel diode 113 alone, drive control part 110D can suppress smooth current flow with resistor 114. In this manner, sharp vibration can be generated, and deterioration of the reproducibility of the vibration for the alternating current signal can be prevented. In addition, even in the case where current flows at all times, the temperature rise of the device due to Joule heat can be prevented with resistor 114.

In addition, by increasing the resistance value of resistor 114, the rise of the driving current of electromagnetic actuator 10 becomes sharp, and thus electromagnetic actuator 10 can generate sharp vibration corresponding to the input of the alternating current signal of the audio sound source, for example.

Example Configuration 5 of Vibration Transmitting Unit

FIG. 21 is a diagram for describing vibration transmitting unit 300E. Drive control part 110E illustrated in FIG. 21 is an example of the driving circuit for driving and controlling electromagnetic actuator 10.

Vibration transmitting unit 300E illustrated in FIG. 21 includes vibration transmitting device 100 (electromagnetic actuator 10), signal input part 120B, and drive control part 110E interposed between signal input part 120B and electromagnetic actuator 10.

Drive control part 110E includes rectification diodes 112 and 115, resistor 114, and operational amplifier 116 as an amplification part (computation amplifier).

In drive control part 110E, operational amplifier 116 and rectification diode 112 connected to the output side of operational amplifier 116 are inserted in the forward direction between signal input part 120B and electromagnetic actuator 10. In addition, in drive control part 110E, resistor 114 is inserted in parallel to electromagnetic actuator 10 between the terminals of electromagnetic actuator 10. Further, other rectification diode 115 connected between operational amplifier 116 and rectification diode 112 is inserted in parallel to electromagnetic actuator 10. In this manner, drive control part 110E is composed of an operational amplifier circuit including operational amplifier 116.

Drive control part 110E can achieve a so-called ideal diode because it uses operational amplifier 116, and can prevent forward voltage drop in the configuration using rectification diode 112. Specifically, even in the case where the input alternating current signal is a minute voltage component, it can be reproduced, i.e., a driving signal corresponding to the minute voltage component can be generated, and supplied to electromagnetic actuator 10. In this manner, drive control part 110E can generate at electromagnetic actuator 10 vibration synchronized to the frequency of the input alternating current signal.

With vibration transmitting units 300A to 300E described above, the output can be increased even in a small-sized product through efficient driving. That is, by using electromagnetic actuator 10, strong vibration can be immediately transmitted to the user while achieving cost reduction and thickness reduction.

In addition, vibration transmitting units 300B to 300E of the above-described example configurations 2 to 5 can transmit the vibration synchronized to the input alternating current signal (for example, the alternating current signal of the audio sound source) to the user by using the above-described protruding part 82.

In addition, in the above-mentioned example configurations 2 to 5, the driving signal output from drive control parts 110B to 110E may be amplified in accordance with the input alternating current and input to signal, electromagnetic actuator 10. In this case, for example, an amplification circuit is disposed between drive control parts 110B to 110E and electromagnetic actuator 10.

In addition, in the above-mentioned example configurations 2 to 5, drive control parts 110B to 110E may be mounted integrally with electromagnetic actuator 10. In the case where drive control parts 110B to 110E are provided as members separated from electromagnetic actuator 10, the circuit design of drive control parts 110B to 110E is burdensome and requires a dedicated circuit configuration. On the other hand, in the case where drive control parts 110B to 110E are mounted integrally with electromagnetic actuator 10, the circuit design of drive control parts 110B to 110E as the external circuit or the dedicated circuit configuration are not required. That is, another circuit is not required as long as there is a circuit (for example, a sound source circuit for inputting sound) for inputting a signal to signal input part 120B. Therefore, for example, the alternating current signal of the audio sound source can be input to signal input part 120B as it is, which improves the convenience of use.

Mounting Example of Vibration Transmitting Unit

FIG. 22 is a diagram illustrating a mounting example of a vibration transmitting unit. FIG. 22 illustrates an example in which vibration transmitting unit 300B illustrated in FIG. 18 is used, and vibration transmitting devices 100-1 and 100-2 with the same configuration as that of vibration transmitting device 100 are mounted in seat 400, for example. Note that vibration transmitting unit 300B illustrated in FIG. 22 is not limitative, and the above-mentioned vibration transmitting unit 300A and vibration transmitting units 300C to 300E may be used.

In addition, the following describes an example in which seat 400 is configured as an audio device, or more specifically, a gaming audio device, while seat 400 may be configured as a warning notification device and a massage device as described above.

Seat 400 includes vibration transmitting unit 300B, and vibration transmitting unit 300B includes vibration transmitting devices 100-1 and 100-2, drive control part 110B, and signal input part 120B. Here, as an example, vibration transmitting device 100-1 is mounted in backrest part 412 of seat 400, and vibration transmitting device 100-2 is mounted in seat part 414 of seat 400, while the number of vibration transmitting devices 100 mounted may be one, or three or more.

Seat 400 is a seat on which the user sits when playing a game, and signal input part 120B is connected to the game machine body. When the audio signal of the sound (music or acoustics) output in accordance with the game content is input from the game machine body to signal input part 120B, drive control part 110B performs half-wave rectification of the input audio signal, and inputs it into vibration transmitting devices 100-1 and 100-2 as a driving signal. The driving signal input to vibration transmitting devices 100-1 and 100-2 is input to each electromagnetic actuator 10, and each electromagnetic actuator 10 generates vibration synchronized to the frequency (period) of the input audio signal.

In this manner, seat 400 can transmit vibration corresponding to the sound output in accordance with game content, and provide the sense of operation and realism of the game, to the user seated in seat 400. In this manner, seat 400 can be configured as an experience simulator seat to experience the game, and a listening seat to experience the sounds made by the game.

In the configuration illustrated in FIG. 22, seat 400 transmits the vibration to the user through its seat surface member. Vibration transmitting devices 100-1 and 100-2 may be mounted in seat 400 such that protruding part 82 is exposed from backrest part 412 and seat part 414, and in this case, seat 400 can directly transmit the vibration to the user.

Embodiments and variations of the present invention are described above. The above description is an example of a suitable embodiment of the invention, and the scope of the invention is not limited thereto. In other words, the above description of the configuration of the device and the shape of each part is an example, and it is clear that various changes and additions to these examples are possible within the scope of the invention.

For example, in the present embodiment, the driving direction of movable body 40 (movable panel 81 and protruding part 82) of electromagnetic actuator 10 is the Z direction, but this is not limitative. For example, even when the direction is set to the X direction and/or the Y direction, the above-described effects such as efficient driving and enhanced vibration can be achieved.

This application is entitled to and claims the benefit of Japanese Patent Application No. 2021-109231 filed on Jun. 30, 2021, the disclosure each of which including the specification, drawings and abstract is incorporated herein by reference in its entirety.

INDUSTRIAL APPLICABILITY

The vibration transmitting device according to the present invention can achieve cost reduction and thickness reduction by using the electromagnetic actuator, and can efficiently generate a suitable thrust for the vibration transmitted to the user. For example, the vibration transmitting device according to the present invention is useful for applications such as warning notification devices, audio devices, and massage devices.

REFERENCE SIGNS LIST

10 Electromagnetic actuator
11 Support column
20 Core assembly
20*a*, 20*b* Opposing surface
22 Coil
24 Core
26 Bobbin
26*a*, 26*b* Divided member
28 Fixing hole
29 Screw
30 Fixing body
32 Base part 32*a* Attaching part
32*b* Bottom surface part
33 Securing hole
36 Opening
40 Movable body
41 Yoke
42 Surface part fixing hole
44 Surface part fixing part
44*a* Fixing surface
46, 47 Attracted surface part
48 Opening
49 Notch part
50, 50-1, 50-2 Elastic part
52 Fixing body side fixing part
54 Movable body side fixing part
56 Meandering elastic arm part
57, 58 Screw
60 Housing lid part
61 Opposing surface
61*a* Inner surface
62 Opening
63 Impact absorbing part
64 Bottom part
64*a* Corner part
65 Insert nut
66 Flange part
67 Protective cover
70 Housing base part
71 Fixing plate
71*a* Inner surface
72 Projecting part
73 Insertion part
74 Recess
75 Through hole
76 Rib
77, 78 Screw
80 Transmitting part
81 Movable panel
81*a* Top surface
81*b* Bottom surface
82 Protruding part
82*a* Tip end portion
82*b* Flange part
83, 84 Screw
85 Spacer
86 Impact absorbing part
100, 100-1, 100-2 Vibration transmitting device
110A, 110B, 110C, 110D, 110E Drive control part
111 Switching element
112 Rectification diode
113 Free wheel diode
114 Resistor
115 Rectification diode
116 Operational amplifier
120A Signal generation part
120B Signal input part
241 Core body
242 Magnetic pole part
244 Magnetic pole part
300A, 300B, 300C, 300D, 300E Vibration transmitting unit
321, 322 Fixing hole
400 Seat
412 Backrest part
414 Seat part

The invention claimed is:

1. A vibration transmitting device, comprising:
a vibration actuator including a fixing body formed in a plate-shape and a movable body, and configured to vibrate the movable body by driving the movable body in one direction of a vibration direction of the movable body, the fixing body including an electromagnet formed in a plate-shape including a coil and a core around which the coil is wound, and the movable body including a yoke formed in a plate-shape disposed to face the electromagnet in a direction intersecting a winding axis of the coil, and being supported such that the movable body is allowed to elastically vibrate with respect to the fixing body, the yoke comprising a magnetic member; and
a housing part configured to house inside the vibration actuator, wherein
the housing part includes an opening configured to expose at least a part of the movable body such that the movable body makes contact with an object to which vibration is to be applied.

2. The vibration transmitting device according to claim 1, wherein the movable body includes a protruding part protruded to outside of the housing part through the opening.

3. The vibration transmitting device according to claim 1, further comprising a limiting part configured to limit a movable range of the movable body.

4. The vibration transmitting device according to claim 3, wherein the limiting part includes an impact absorbing part configured to absorb an impact of the movable body when the movable body is limited.

5. The vibration transmitting device according to claim 4, wherein the impact absorbing part is a damper comprising an elastomer.

6. The vibration transmitting device according to claim 1, further comprising a labyrinth structure disposed in a gap between the opening and the movable body.

7. The vibration transmitting device according to claim 1, further comprising an extendable cover configured to cover the opening from outside of the housing part.

8. The vibration transmitting device according to claim 1, wherein the vibration actuator includes:
a elastic part configured to support the movable body with respect to the fixing body in a direction of facing at least one end portion of both end portions of the movable body, the elastic part being elastically deformable, and
wherein the yoke is disposed near both end portions of the core.

9. The vibration transmitting device according to claim 8, further comprising a half-wave rectifier circuit configured to drive the vibration actuator.

10. A warning notification device, comprising the vibration transmitting device according to claim 1, wherein
the warning notification device notices a warning to a subject person by providing vibration to the subject person by the vibration transmitting device.

11. An audio device, comprising the vibration transmitting device according to claim 1, wherein
the audio device provides vibration based on a sound source to a subject person by the vibration transmitting device.

12. A massage device, comprising the vibration transmitting device according to claim 1, wherein
the massage device performs a massage for a subject person by providing vibration to the subject person by the vibration transmitting device.

13. A vibration transmitting device, comprising:

a vibration actuator configured to vibrate a movable body by driving the movable body in one direction of a vibration direction of the movable body, the movable body being supported such that the movable body is allowed to elastically vibrate with respect to a fixing body;

a housing part configured to house inside the vibration actuator; and a labyrinth structure, wherein the housing part includes an opening configured to expose at least a part of the movable body such that the movable body makes contact with an object to which vibration is to be applied, and wherein the labyrinth structure is disposed in a gap between the opening and the movable body.

* * * * *